US008548486B2

(12) United States Patent  
Ode et al.

(10) Patent No.: US 8,548,486 B2  
(45) Date of Patent: Oct. 1, 2013

(54) RADIO COMMUNICATION SYSTEM, BASE STATION APPARATUS, TERMINAL APPARATUS, RELAY STATION APPARATUS AND RADIO COMMUNICATION METHOD FOR RADIO COMMUNICATION SYSTEM

(75) Inventors: Takayoshi Ode, Kawasaki (JP); Takaharu Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/338,494

(22) Filed: Dec. 28, 2011

(65) Prior Publication Data  
US 2012/0094682 A1  Apr. 19, 2012

Related U.S. Application Data

(63) Continuation of application No. PCT/JP2009/003324, filed on Jul. 25, 2009.

(51) Int. Cl.  
*H04W 72/00*  (2009.01)

(52) U.S. Cl.  
USPC ............. 455/452.1; 455/451; 455/450; 455/7

(58) Field of Classification Search  
USPC ................................... 455/7, 452.1, 450, 451  
See application file for complete search history.

(56) References Cited

U.S. PATENT DOCUMENTS

| 2006/0003760 | A1 | 1/2006 | Li et al. | |
| 2007/0082621 | A1 | 4/2007 | Lee et al. | |
| 2009/0201846 | A1* | 8/2009 | Horn et al. | 370/315 |
| 2009/0227201 | A1 | 9/2009 | Imai et al. | |
| 2009/0245188 | A1 | 10/2009 | Fukuoka et al. | |
| 2010/0035541 | A1* | 2/2010 | Kim et al. | 455/9 |
| 2010/0035620 | A1* | 2/2010 | Naden et al. | 455/450 |
| 2010/0157826 | A1* | 6/2010 | Yu et al. | 370/252 |

FOREIGN PATENT DOCUMENTS

| JP | 2004-068876 | 8/2004 |
| JP | 2006-516840 | 7/2006 |
| JP | 2006/098273 | 9/2006 |
| JP | 2006-262511 | 9/2006 |
| JP | 2007-110725 | 4/2007 |
| JP | 2007-150911 | 6/2007 |

(Continued)

OTHER PUBLICATIONS

International Search Report dated Aug. 18, 2009, from corresponding International Application No. PCT/JP2009/003324.

(Continued)

*Primary Examiner* — Barry Taylor  
(74) *Attorney, Agent, or Firm* — Katten Muchin Rosenman LLP

(57) ABSTRACT

A radio communication system including: a base station; a terminal; and a relay station, wherein the base station and the terminal perform radio communication via the relay station, the base station includes: a change unit which changes at least any of a radio resource allocation method for the relay station and the terminal, the radio resource allocation method and a scheduling method, or the radio resource allocation method, the scheduling method and a relay method in the relay station; and a transmission unit which transmits a change notice for notifying the relay station of the change by the change unit, the relay station includes a reception unit which receives the change notice, and the base station, the relay station, and the terminal perform radio communication using at least the radio resources allocating or allocated by the radio resource allocation method after the change.

12 Claims, 28 Drawing Sheets

(56) References Cited

FOREIGN PATENT DOCUMENTS

| JP | 2007-267245 | 10/2007 |
|---|---|---|
| JP | 2011-509587 | 3/2011 |
| WO | 2006/098273 | 9/2006 |
| WO | 2007/119452 | 10/2007 |
| WO | 2009/084760 | 7/2009 |

OTHER PUBLICATIONS

Michiharu Nakamura, et al. "IEEE802.16j no Gijutsu Gaiyo" 2007 Nen IEICE Communications Society Conference Koen Slide Shiryo BT-2-3, Sep. 11, 2007.
3GPP TR 25.956 V8.0.0; 3rd Generation Partnership Project; Technical Specification Group Radio Access Networks; Universal Terrestrial Radio Access (UTRA) Repeater Planning Guidelines and System Analysis (Release 8), Dec. 2008.
Michael R. Souryal, et al. "Performance of Amplify-And-Forward and Decode-And-Forward Relaying in Rayleigh Fading with Turbo Codes" IEEE, 2006.
Harish Viswanathan, et al. "Performance of Cellular Networks with Relays and Centralized Scheduling" IEEE, 2003.
Ioannis Krikidis, et al. "Three Scheduling Schemes for Amplify-and-Forward Relay Environments" IEEE Communications Letters, vol. 11, No. 5, May 2007.
Liping Wang, et al. "A Novel Centralized Resource Scheduling Scheme in OFDMA-based Two-hop Relay-enhanced Cellular Systems" IEEE International Conference on Wireless & Mobile Computing, Networking & Communication, 2008.
Toshikazu Yokai. "802.16 (BWA) Standardization Trends (6) : IEEE 802.16j (Relay TG) Progress State" Published on WBB Forum http://wbb.forum.impressrd.jp, retrieved on May 21, 2009.
Shunqing Zhang, et al. "Distributed Resource Allocation for OFDMA System with Half-Duplex Relay using Rateless Code" IEEE Information Theory, 2007, ISIT 2007, IEEE International Symposium, pp. 1921-1925, Jun. 24-29, 2007.
Korean Office Action dated Apr. 30, 2013 from corresponding Korean Patent Application No. 10-2012-7001038.
Notification of Reason for Rejection dated Apr. 30, 2013, from corresponding Japanese Application No. 2011-522624.

\* cited by examiner

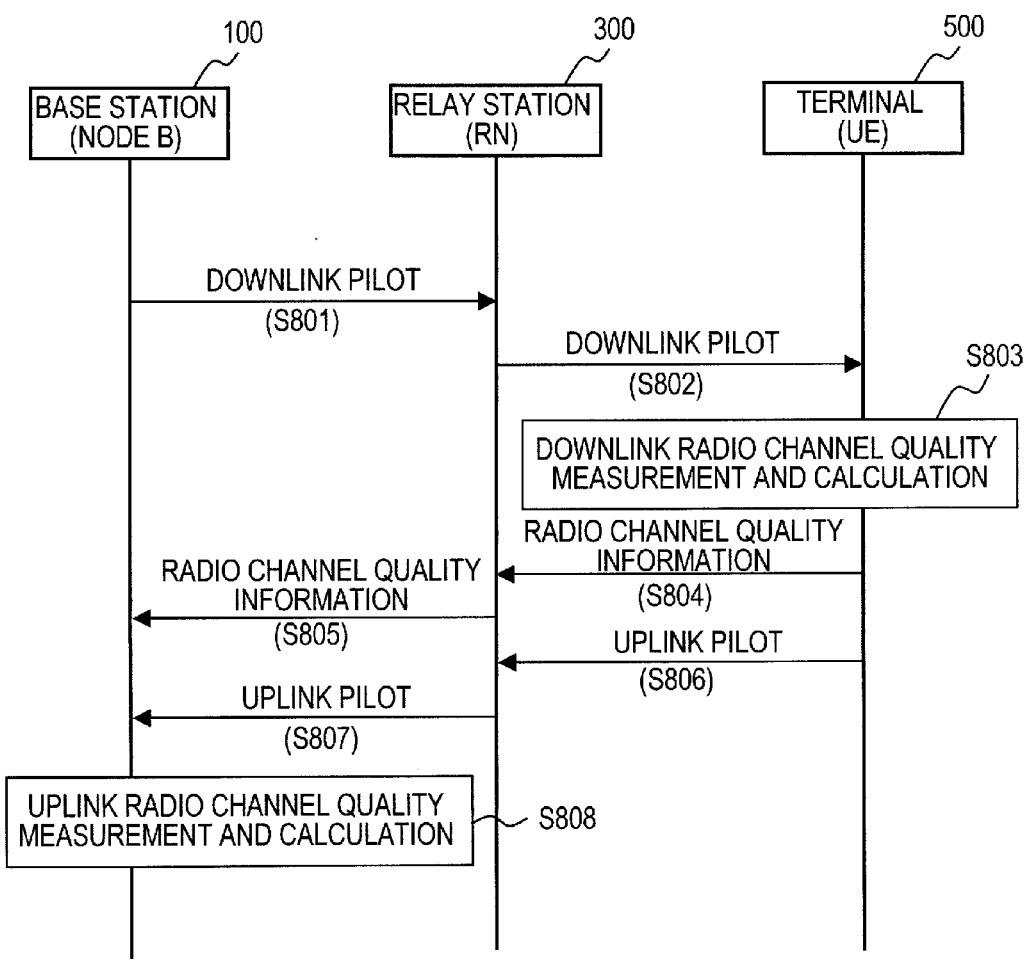

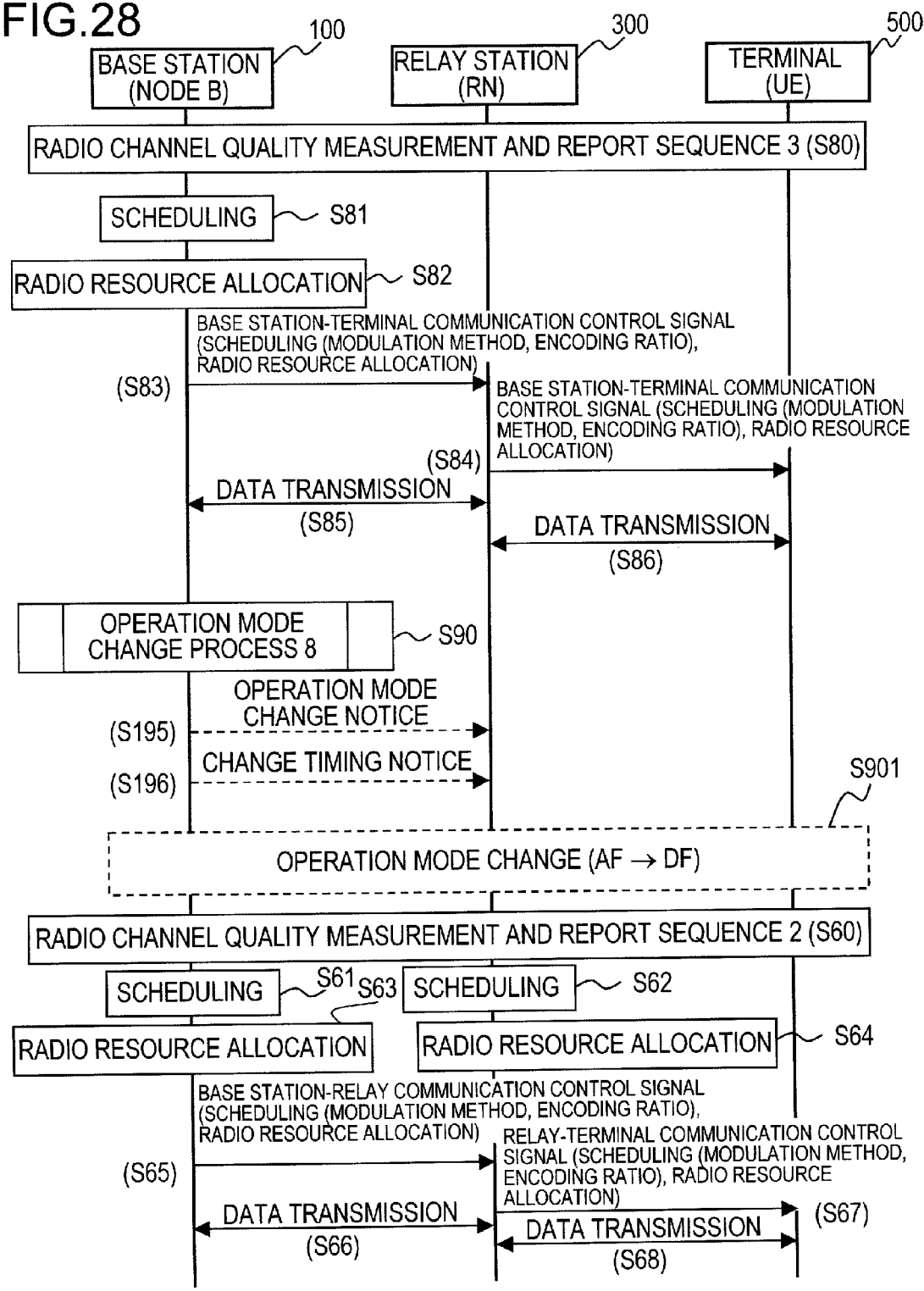

RADIO COMMUNICATION SYSTEM, BASE STATION APPARATUS, TERMINAL APPARATUS, RELAY STATION APPARATUS AND RADIO COMMUNICATION METHOD FOR RADIO COMMUNICATION SYSTEM

CROSS REFERENCE TO RELATED APPLICATION

This application is a continuation of International Application No. PCT/JP2009/003324, filed on Jul. 15, 2009, now pending, herein incorporated by reference.

TECHNICAL FIELD

The embodiments discussed herein are related to a radio communication system, a base station apparatus, a terminal apparatus, a relay station apparatus and a radio communication method in the radio communication system.

BACKGROUND ART

A radio communication system which performs radio communication between a base station apparatus (hereafter "base station") and a terminal apparatus (hereafter "terminal") via a relay station apparatus (hereafter "relay station") is available (e.g. Patent Documents 1 and 2 listed below).

In such the radio communication system using the relay station, two relay methods are available: AF (Amplified and Forward) and DF (Decode and Forward) (e.g. Non-patent Documents 1 and 2 listed below).

For the types scheduling for such a radio communication system, centralized scheduling and distributed scheduling have been disclosed (see Non-patent Documents 3 to 5 listed below). Centralized scheduling is a method for a base station to schedule a communication partner (relay station or terminal) of the base station and a communication partner (terminal) of the relay station, for example. Distributed scheduling is a method for a base station to schedule a communication partner of the base station, and a relay station to schedule a communication partner of the relay station.

For allocation of radio resources, it has been disclosed that a radio frame is divided into an access region and a relay region, and radio communication between the base station and the relay station is performed using the access region, and radio communication between the relay station and a terminal is performed using the relay region, for example (e.g. Non-patent Document 6 listed below).

Patent Document 1: Japanese Laid-Open Patent Publication No. 2007-110725
Patent Document 2: Japanese Laid-Open Patent Publication No. 2007-150911
Non-patent Document 1: 3GPP TR 25.956 V8.0.0
Non-patent Document 2: Michael R. Souryal et al, "Performance of Amplify-And-Forward and Decode-And-Forward Relaying in Rayleigh Fading With Turbo Codes"
Non-patent Document 3: Harish Viswanthan et al, "Performance Of Cellular Network With Relays and Centralized Scheduling"
Non-patent Document 4: Ioannis Krikidis et al, "Three Scheduling Schemes for Amplify-And-Forward Relay Environments"
Non-patent Document 5: Liping Wang et al, "A Novel Centralized Resource Scheduling Scheme in OFDMA-Based Two-Hop Relay-Enhanced Cellular Systems"
Non-patent Document 6: Toshikazu Yokai, "802.16 (BWA) Standardization Trends (6): IEEE 801.16j (Relay TG) Progress State"

DISCLOSURE OF THE INVENTION

Problems to be Solved by the Invention

However in the case of using the radio resources of the relay region in the radio communication between a relay station and terminals, in some cases if a number of more than enough radio resources is allocated to the relay region, then terminals which perform radio communication with the relay station is less than a threshold.

Means for Solving the Problem

According to an aspect of the invention, a radio communication system including: a base station apparatus; a terminal apparatus; and a relay station apparatus, wherein the base station apparatus and the terminal apparatus perform radio communication via the relay station apparatus, the base station includes: a change unit which changes at least any of a radio resource allocation method for the relay station apparatus and the terminal apparatus, the radio resource allocation method and a scheduling method, or the radio resource allocation method, the scheduling method and a relay method in the relay station apparatus; and a transmission unit which transmits a change notice for notifying the relay station apparatus of the change by the change unit, the relay station apparatus includes a reception unit which receives the change notice, and the base station apparatus, the relay station apparatus, and the terminal apparatus perform radio communication using at least the radio resources allocating or allocated by the radio resource allocation method after the change.

Effectiveness of the Invention

The present invention can provide a radio communication system, a base station apparatus, a terminal apparatus, a relay station apparatus and a radio communication method for the radio communication system, which allow utilizing radio resources effectively.

BRIEF DESCRIPTION OF THE DRAWINGS

FIG. 27 is a sequence diagram illustrating an operation example; and

FIG. 28 is a sequence diagram illustrating an operation example.

BEST MODE FOR CARRYING OUT THE INVENTION

Embodiments of the present invention will now be described.

First Embodiment

Figure 1:
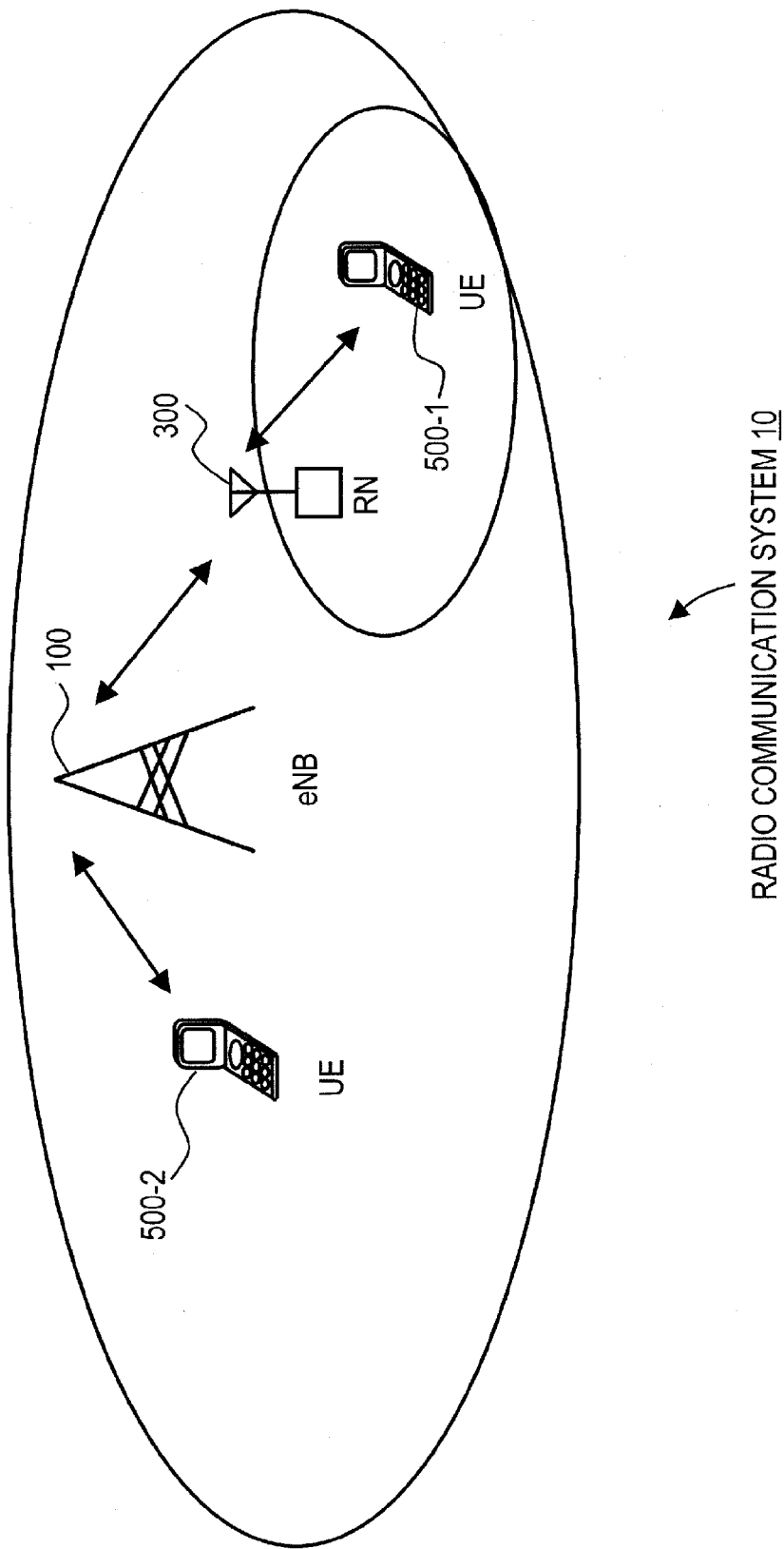
FIG. 1 illustrates a construction example of a radio communication system.

The first embodiment will be described. FIG. 1 illustrates a construction example of a radio communication system 10 according to the first embodiment. The radio communication system 10 has a base station apparatus eNB (eNodeB) 100, a relay station apparatus RN (Relay Node) 300 and a terminal apparatus UE (User Equipment) 500.

The base station apparatus (hereafter "base station") 100 performs radio communication with a terminal apparatus (hereafter "terminal") 500-1 via the relay station apparatus (hereafter "relay station") 300, and can also perform radio communication directly with a terminal 500-2.

Since the radio communication system 10 can perform radio communication via the relay station 300, the service range can be extended and dead zone problems can also be improved.

Now each construction example of the base station 100, the relay station 300 and the terminal 500 will be described.

Figure 2:
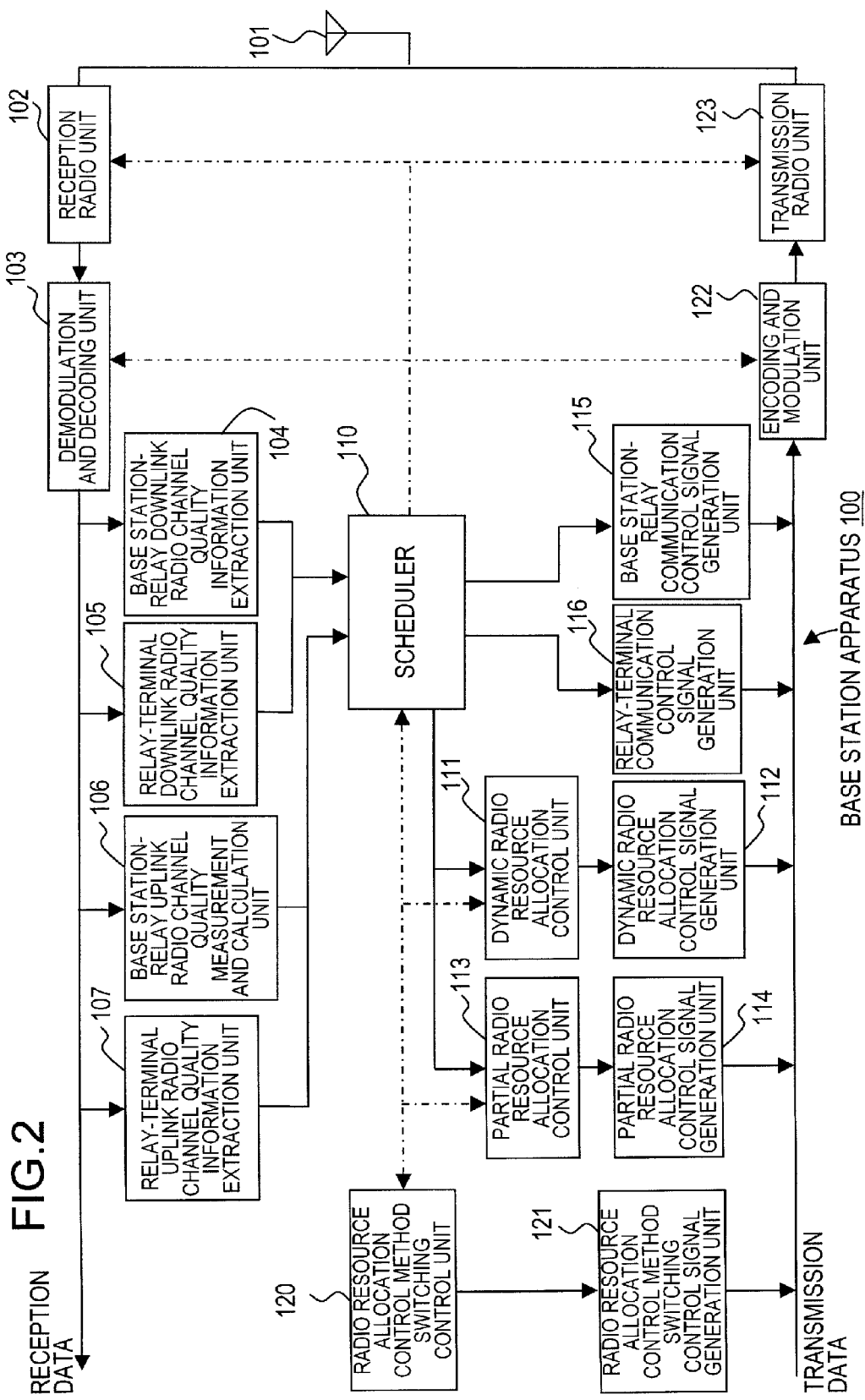
FIG. 2 illustrates a construction example of a base station apparatus.

FIG. 2 illustrates a construction example of the base station 100. The base station 100 has an antenna 101, a reception radio unit 102, a demodulation and decoding unit 103, a base station-relay downlink radio channel quality information extraction unit (hereafter "base station-relay downlink quality extraction unit") 104, a relay-terminal downlink radio channel quality information extraction unit (hereafter "relay-terminal downlink quality extraction unit") 105, a base station-relay uplink radio channel quality information measurement and calculation unit (hereafter "base station-relay uplink quality calculation unit") 106, a relay-terminal uplink radio channel quality information extraction unit (hereafter "relay-terminal uplink quality extraction unit") 107, a scheduler 110, a dynamic radio resource allocation control unit (hereafter "dynamic allocation control unit") 111, a dynamic radio resource allocation control signal generation unit (hereafter "dynamic allocation control signal generation unit") 112, a partial radio resource allocation control unit (hereafter "partial allocation control unit") 113, a partial radio resource allocation control signal generation unit (hereafter "partial allocation control signal generation unit") 114, a base station-relay communication control signal generation unit 115, a relay-terminal communication control signal generation unit 116, a radio resource allocation control method switching control unit (hereafter "switching control unit") 120, a radio resource allocation control method switching control signal generation unit (hereafter "switching control signal generation unit") 121, an encoding and modulation unit 122 and a transmission radio unit 123.

The antenna 101 receives a radio signal transmitted from a relay station 300 or a terminal 500 subordinate to the base station 100, or transmits a radio signal to the relay station 300.

The reception radio unit 102 outputs a radio signal, which is output from the antenna 101, as a receive signal.

The demodulation and decoding unit 103 demodulates and decodes the receive signal, which is output from the reception radio unit 102, according to the scheduling determined by the scheduler 110.

The base station-relay downlink quality extraction unit 104 extracts radio channel quality information in the downlink direction between the base station 100 and the relay station 300 (hereafter "base station-relay downlink quality information"), out of the receive signal which is output from the demodulation and decoding unit 103. The base station-relay downlink quality extraction unit 104 outputs the extracted base station-relay downlink quality information to the scheduler 110.

The relay-terminal downlink quality extraction unit 105 extracts radio channel quality information in the downlink direction between the relay station 300 and the terminal 500 (hereafter "relay-terminal downlink quality information"), out of the receive signal which is output from the demodulation and decoding unit 103. The relay-terminal downlink quality extraction 105 outputs the extracted relay-terminal downlink quality information to the scheduler 110.

The base station-relay uplink quality calculation unit 106 measures and calculates radio channel quality information in the uplink direction between the base station 100 and the relay station 300 (hereafter "base station-relay uplink quality information") based on a pilot signal (or a known signal) which is transmitted from the relay station 300. The base station-relay quality calculation unit 106 outputs the calculated base station-relay uplink quality information to the scheduler 110.

The relay-terminal uplink quality extraction unit 107 extracts radio channel quality information in the uplink direction between the relay station 300 and the terminal 500 (hereafter "relay-terminal uplink quality information"), out of the receive signal which is output from the demodulation and decoding unit 103. The relay-terminal uplink quality extraction unit 107 outputs the extracted relay-terminal uplink quality information to the scheduler 110.

The scheduler 110 performs scheduling for each radio block based on each quality information. For example, the scheduler 110 performs scheduling in the downlink direction from the base station 100 to the relay station 300 based on the base station-relay downlink quality information. In the first embodiment, the scheduler 110 performs centralized scheduling, where scheduling is performed based on the received quality information on each radio block.

Figure 11:
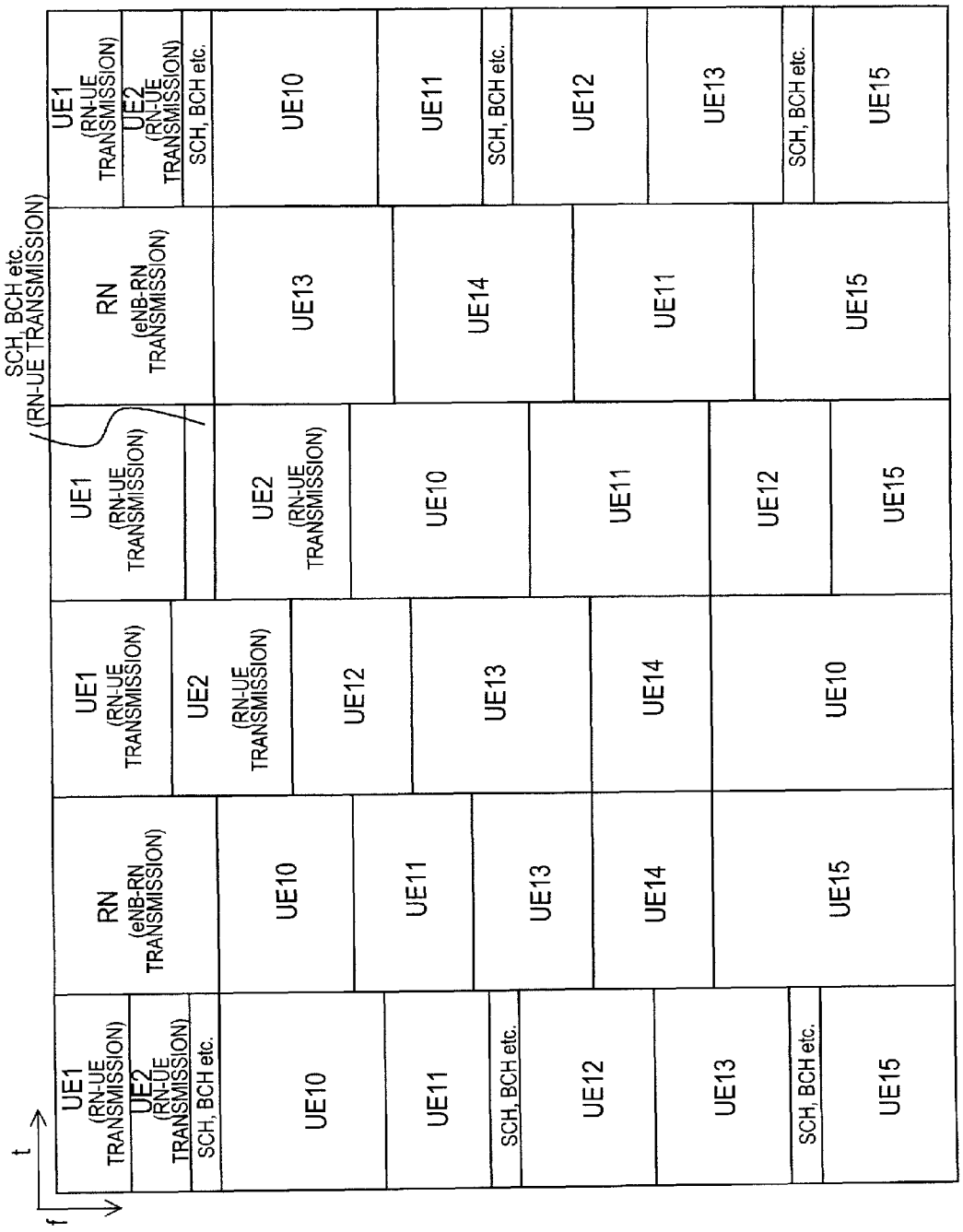
FIG. 11 illustrates a construction example of a radio frame.

The dynamic allocation control unit 111 performs dynamic radio resource allocation for allocating radio resources. Dynamic radio resource allocation is a method for dynamically allocating the radio resources used by the base station 100 and the relay station 300 in a radio frame without separation, for example. FIG. 11 illustrates a construction example of a radio frame based on the dynamic radio resource allocation. The dynamic allocation control unit 111 outputs information on the allocated radio resource to the dynamic allocation control signal generation unit 112. The dynamic allocation control unit 111 controls the reception radio unit 102 or the transmission radio unit 123, so that data can be received from or transmitted to the relay station 300 using the allocated radio resource.

The dynamic allocation control signal generation unit 112 generates a dynamic radio resource allocation control signal (hereafter "dynamic allocation control signal") based on the information on the radio resources. The dynamic allocation control signal generation unit 112 outputs the dynamic allocation control signal to the encoding and modulation unit 122.

Figures 10A, 10B:
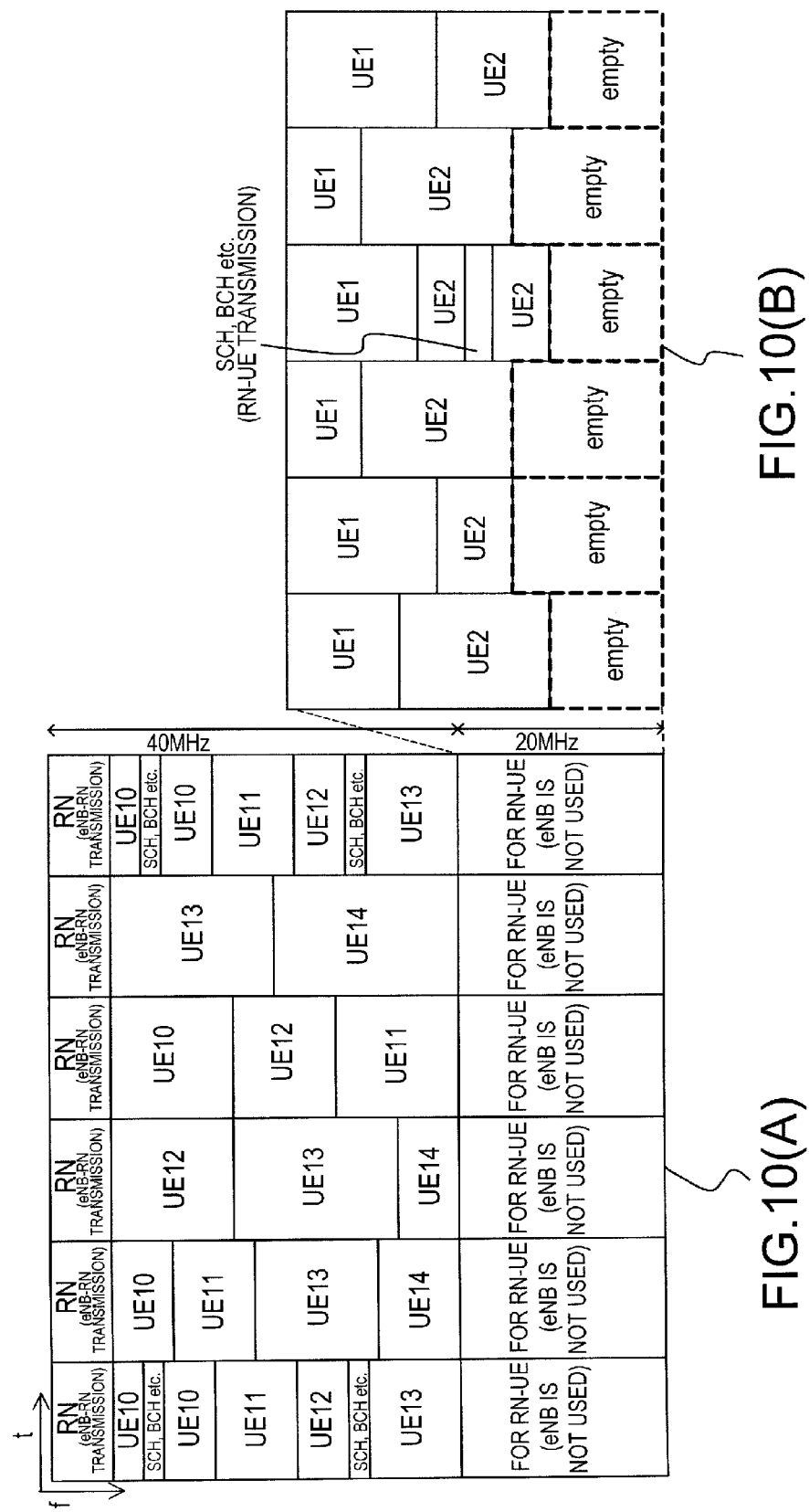
FIG. 10(A) and FIG. 10(B) illustrate a construction example of a radio frame.

The partial allocation control unit 113 performs partial radio resource allocation to allocate the radio resources. Partial radio resource allocation is a method for separately allocating radio resources into the radio resource used by the base station 100 and a radio resource used by the relay station 300 in the radio frame, for example. FIG. 10(A) and FIG. 10(B) illustrate a construction example of a radio frame based on the partial radio resource allocation. The partial allocation control unit 113 outputs the information on the radio resources to the partial allocation control signal generation unit 114. The partial allocation control unit 113 also controls the reception radio unit 102 or the transmission radio unit 123, so that data can be received from or transmitted to the relay station 300 using the allocated radio resource.

The partial allocation control signal generation unit 114 generates a partial radio resource allocation control signal (hereafter "partial allocation control signal") based on the information on the radio resource. The partial allocation control signal generation unit 114 outputs the partial allocation control signal to the encoding and modulation unit 122.

The base station-relay communication control signal generation unit 115 generates a base station-relay communication control signal which includes the scheduling information between the base station 100 and the relay station 300, based on the scheduling information which is output from the scheduler 110. The base station-relay communication control signal generation unit 115 outputs the generated base station-relay communication control signal to the encoding and modulation unit 122.

The relay-terminal communication control signal generation unit 116 generates a relay-terminal communication control signal which includes the scheduling information between the relay station 300 and the terminal 500 based on the scheduling information which is output from the scheduler 110. The relay-terminal communication control signal generation unit 116 outputs the generated relay-terminal communication control signal to the encoding and modulation unit 122.

The switching control unit 120 switches the radio resource allocation method. For example, the switching control unit 120 switches the partial radio resource allocation to the dynamic radio resource allocation based on the radio resource amount. To switch to the partial radio resource allocation, the switching control unit 120 turns the power of the partial allocation control unit 113 ON, and turns the power of the dynamic allocation control unit 111 OFF. To switch the dynamic radio resource allocation, the switching control unit 120 turns the power of the partial allocation control unit 113 OFF, and turns the power of the dynamic allocation control unit 111 ON. Details on the switching will be described later. The switching control unit 120 outputs the information on the radio resource allocation method to the switching control signal generation unit 121.

The switching control signal generation unit 121 generates a switching control signal which includes the information on the radio resource allocation method, based on the information on the radio resource allocation method. The switching control signal generation unit 121 outputs the switching control signal to the encoding and modulation unit 122.

The encoding and modulation unit 122 performs encoding and modulation process on the transmission data according to the scheduling determined by the scheduler 110. The encoding and modulation unit 122 may perform encoding and so on each control signal.

The transmission radio unit 123 outputs the output from the encoding and modulation unit 122 as a radio signal. The radio signal is transmitted to the relay station 300 and so on via the antenna 101.

Figure 3:
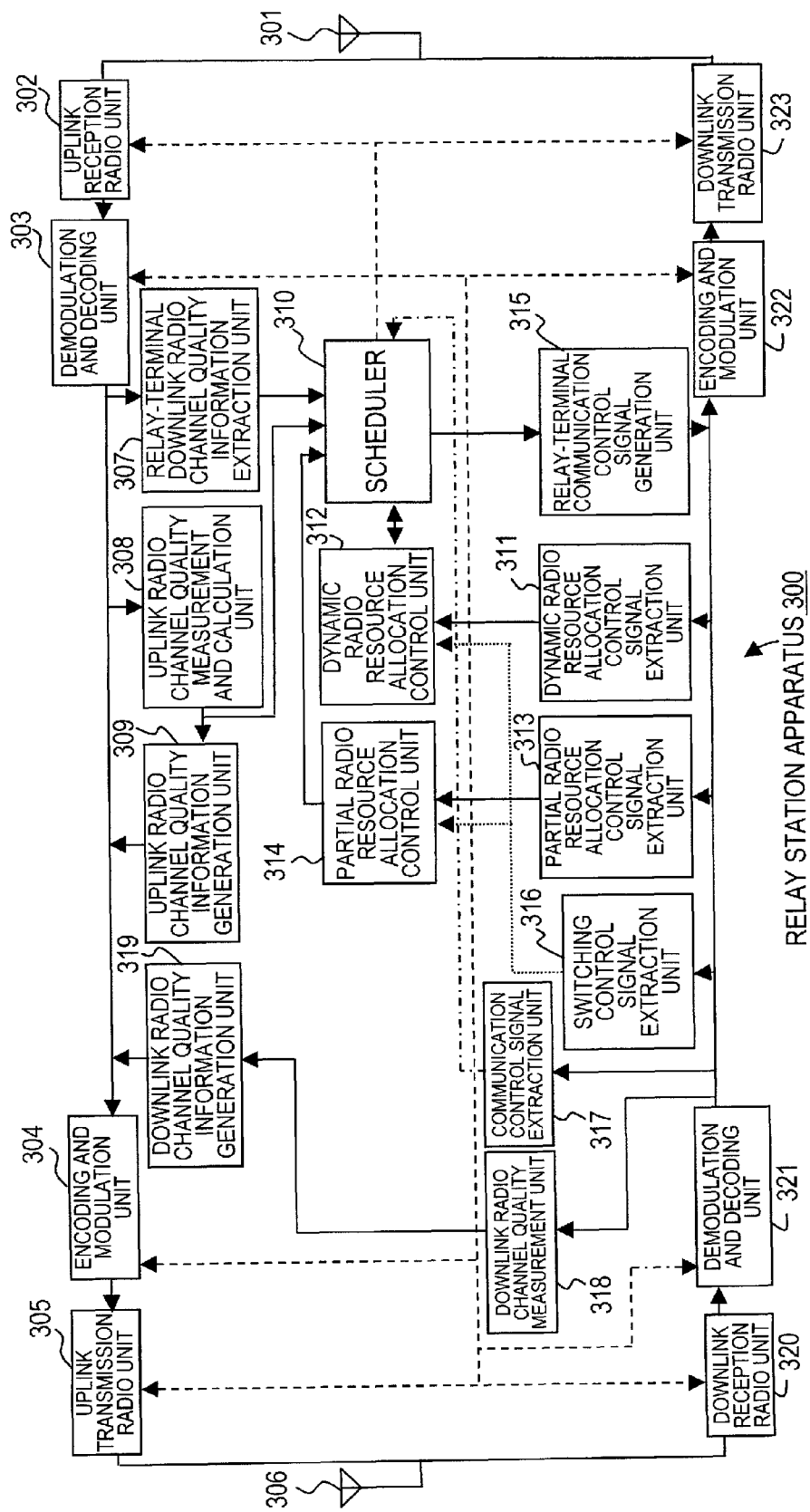
FIG. 3 illustrates a construction example of a relay station apparatus.

FIG. 3 illustrates a construction example of the relay station 300. The relay station 300 has an antenna 301, an uplink reception radio unit 302, a demodulation and decoding unit 303, an encoding and modulation unit 304, an uplink transmission radio unit 305, an antenna 306, a relay-terminal downlink radio channel quality information extraction unit (hereafter "relay-terminal downlink quality extraction unit") 307, an uplink radio channel quality measurement and calculation unit (hereafter "uplink quality calculation unit") 308, an uplink radio channel quality information generation unit (hereafter "uplink quality information generation unit") 309, a scheduler 310, a dynamic radio resource allocation control signal extraction unit (hereafter "dynamic allocation control signal extraction unit") 311, a dynamic radio resource allocation control unit (hereafter "dynamic allocation control unit") 312, a partial radio resource allocation control signal extraction unit (hereafter "partial allocation control signal extraction unit") 313, a partial radio resource allocation control unit (hereafter "partial allocation control unit") 314, a relay-terminal communication control signal generation unit 315, a switching control signal extraction unit 316, a communication control signal extraction unit 317, a downlink radio channel quality measurement unit 318, a downlink reception radio unit 320, a demodulation and decoding unit 321, an encoding and modulation unit 322 and a downlink transmission radio unit 323.

The antenna 301 transmits/receives a radio signal to/from the terminal 500.

The uplink reception radio unit 302 outputs the radio signal, which was received by the antenna 301 and transmitted from the terminal 500 as a received signal.

The demodulation and decoding unit 303 demodulates and decodes the received signal which is output from the uplink reception radio unit 302, based on the scheduling information determined by the scheduler 310.

The encoding and modulation unit 304 encodes and modulates the received signals which is output from the demodulation and decoding unit 303, based on the scheduling information determined by the scheduler 310.

The uplink transmission radio unit 305 outputs the receive signal, which is output from the encoding and modulation unit 304, to the antenna 306 as a radio signal.

The antenna 306 transmits/receives the radio signal to/from the base station 100.

The relay-terminal downlink quality extraction unit 307 extracts the relay-terminal downlink quality information transmitted from the terminal 500, for example, out of the receive signal which is output from the demodulation and decoding unit 303. The relay-terminal downlink quality extraction unit 307 outputs the extracted relay-terminal downlink quality information to the scheduler 310.

The uplink quality calculation unit 308 measures and calculates radio channel quality in the uplink direction between the relay station 300 and the terminal 500 (hereafter "relay-terminal uplink quality") based on a pilot signal transmitted from the terminal 500. The uplink quality calculation unit 308 outputs the calculated radio channel quality in the uplink direction to the scheduler 310 and the uplink quality information generation unit 309.

The uplink quality information generation unit 309 generates relay-terminal uplink quality information when the uplink radio channel quality is input. The uplink quality information generation unit 309 outputs the generated uplink radio channel quality information to the encoding and modulation unit 304, and transmits this information to the base station 100.

The scheduler 310 performs scheduling on the radio communication with subordinate terminals 500. In the first embodiment, scheduling is performed by the centralized scheduling, hence the scheduler 310 executes scheduling according to the scheduler 110 of the base station 100.

The dynamic allocation control signal extraction unit 311 extracts the dynamic allocation control signal transmitted from the base station 100, out of the received signals which are output from the demodulation and decoding unit 321. The dynamic allocation control signal extraction unit 311 outputs the extracted dynamic allocation control signal to the dynamic allocation control unit 312.

The dynamic allocation control unit 312 performs dynamic radio resource allocation to the subordinate terminals 500 based on the dynamic allocation control signal. Since the dynamic radio resource allocation is executed by the base station 100, the dynamic allocation control unit 312 allocates the radio resources according to the dynamic allocation control signal, for example. The dynamic allocation control unit 312 also controls the uplink reception radio unit 302, so that the data can be transmitted or received between the base station 100 and the terminal 500 using the allocated radio resource.

The partial allocation control signal extraction unit 313 extracts a partial allocation control signal which is transmitted from the base station 100, out of the receive signals which are output from the demodulation and decoding unit 321, and outputs this signal to the partial allocation control unit 314.

The partial allocation control unit 314 allocates the radio resources to the subordinate terminals 500 in a predetermined region of the radio frame based on the partial allocation control signal. The partial allocation control unit 314 controls the uplink reception radio unit 302 so that data can be transmitted or received between the base station 100 and the terminal 500 using the allocated radio resource.

The relay-terminal communication control signal generation unit 315 inputs scheduling information determined by the scheduler 310 from the scheduler 310, and generates a communication control signal between the relay station 300 and the terminal 500. The relay-terminal communication control signal generation unit 315 outputs the generated relay-terminal communication control signal to the encoding and modulation unit 322. The relay-terminal communication control signal generation unit 315 also generates a pilot signal, for example, and transmits the pilot signal to the terminal 500 via the encoding and modulation unit 322.

The switching control signal extraction unit 316 extracts a switching control signal, which is transmitted from the base station 100, out of the received signals which are output from the modulation and decoding unit 321. If the switching control signal includes information to instruct switching from the partial radio resource allocation to the dynamic radio resource allocation, for example, the switching control signal extraction unit 316 turns the power of the dynamic allocation control unit 312 ON, and turns the power of the partial allocation control unit 314 OFF. If the switching control signal includes information to instruct switching from the dynamic radio resource allocation to the partial radio resource allocation, the switching control signal extraction unit 316 turns the power of the partial allocation control unit 314 ON, and turns the dynamic allocation control unit 312 OFF.

The downlink radio channel quality measurement unit 318 measures the radio channel quality in the downlink direction between the base station 100 and the relay station 300 based on the pilot signal transmitted from the base station 100.

The downlink radio channel quality information generation unit 319 generates base station-relay downlink quality information based on the downlink radio channel quality measured by the downlink radio channel quality measurement unit 318. The downlink radio channel quality information generation unit 319 transmits the base station-relay downlink quality information to the base station 100 via the encoding and modulation unit 304.

The downlink reception radio unit 320 outputs a radio signal, which is output from the antenna 306, as a received signal.

The demodulation and decoding unit 321 demodulates and decodes the receive signal, which is output from the downlink reception radio unit 320, based on the scheduling determined by the scheduler 310.

The encoding and modulation unit 322 encodes and modulates the received signal, which is output from the demodulation and decoding unit 321 based on the scheduling determined by the scheduler 310.

The downlink transmission radio unit 323 converts the receive signal, which is output from the encoding and modulation unit 322, into a radio signal, and outputs this radio signal to the antenna 301. This radio signal is transmitted to the terminal 500.

Figure 4:
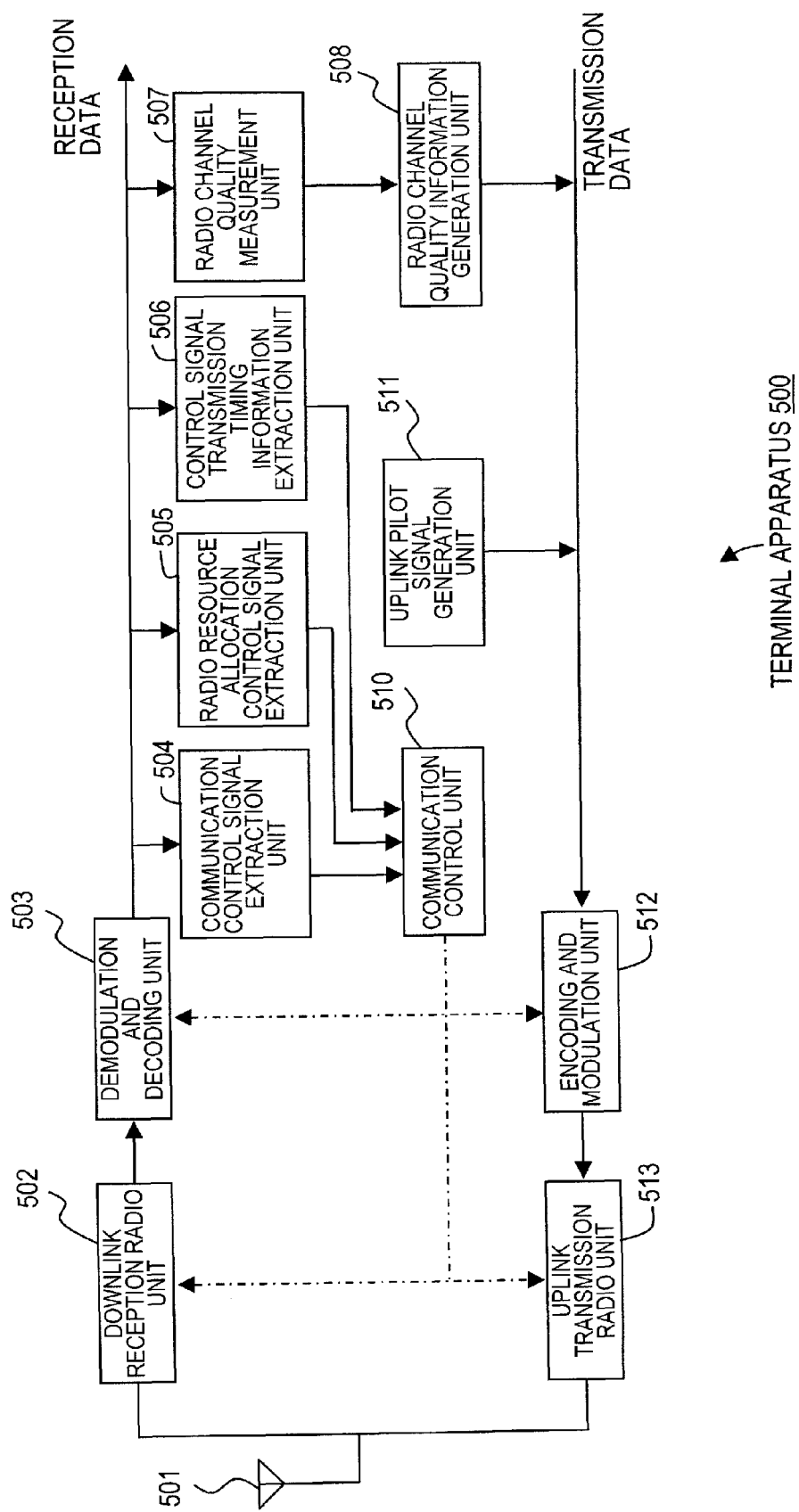
FIG. 4 illustrates a construction example of a terminal apparatus.

FIG. 4 illustrates a construction example of the terminal 500. The terminal 500 has an antenna 501, a downlink reception radio unit 502, a demodulation and decoding unit 503, a communication control signal extraction unit 504, a radio resource allocation control signal extraction unit (hereafter "allocation control signal extraction unit") 505, a control signal transmission timing information extraction unit 506, a radio channel quality measurement unit 507, a radio channel quality information generation unit 508, a communication control unit 510, an uplink pilot signal generation unit 511, an encoding and modulation unit 512 and an uplink transmission radio unit 513.

The antenna 501 transmits/receives a radio signal to/from the relay station 300. The antenna 501 may transmit and receive the radio signal directly to and from the base station 100, for example.

The downlink reception radio unit 502 outputs a radio signal, which is output from the antenna 501, as a receive signal.

The demodulation and decoding unit 503 demodulates and decodes the received signal, which is output from the downlink reception radio unit 502, based on the control by the communication control unit 510.

The communication control signal extraction unit 504 extracts a communication control signal (e.g. relay-terminal communication control signal) which is transmitted from the relay station 300, out of the received signals which are output from the demodulation and decoding unit 503, and outputs this signal to the communication control unit 510.

The allocation control signal extraction unit 505 extracts a partial allocation control signal or a dynamic allocation control signal, which is transmitted from the base station 100 via the relay station 300, out of the received signals which are output from the demodulation and decoding unit 503. The allocation control signal extraction unit 505 outputs the extracted radio resource allocation control signal to the communication control unit 510.

The control signal transmission timing information extraction unit 506 extracts the transmission timing information of synchronization information and notification information, which are transmitted from the base station 100 via the relay station 300. The control signal transmission timing information extraction unit 506 outputs the transmission timing information to the communication control unit 510. The control signal transmission timing information is generated by the communication control signal generation units 115 and 116 of the base station 100, for example.

The radio channel quality measurement unit 507 extracts a pilot signal which is transmitted from the relay station 300, out of the received signals which are output from the demodulation and decoding unit 503, and measures the radio channel quality in the downlink direction between the relay station 300 and terminal 500 based on this pilot signal.

The radio channel quality information generation unit 508 generates relay-terminal downlink quality information based on the radio channel quality which is output from the radio channel quality measurement unit 507, and outputs this information to the encoding and modulation unit 512.

The communication control unit 510 controls the demodulation and decoding unit 503 based on the relay-terminal communication control signal, for example, so that data transmitted from the relay station 300 can be demodulated. The communication control unit 510 also controls the downlink reception radio unit 502 and the uplink transmission radio unit 513 using the radio resource included in the allocation control signal, so as to transmit or receive data. Furthermore the communication control unit 510 can control each radio unit 502, 513 or the like, so that the communication control signal and data can be transmitted or received according to the control signal transmission timing information.

The uplink pilot signal generation unit 511 generates a pilot signal used with the relay station 300 in the uplink direction, and transmits this signal to the relay station 300 via the encoding and modulation unit 512.

The encoding and modulation unit 512 encodes and modulates the transmission data based on the control by the communication control unit 510.

The uplink transmission radio unit 513 outputs the transmission data, which is output from the encoding and modulation unit 512, as a radio signal based on the control by the communication control unit 510. This radio signal is transmitted to the relay station 300 via the antenna 501.

Figure 5:
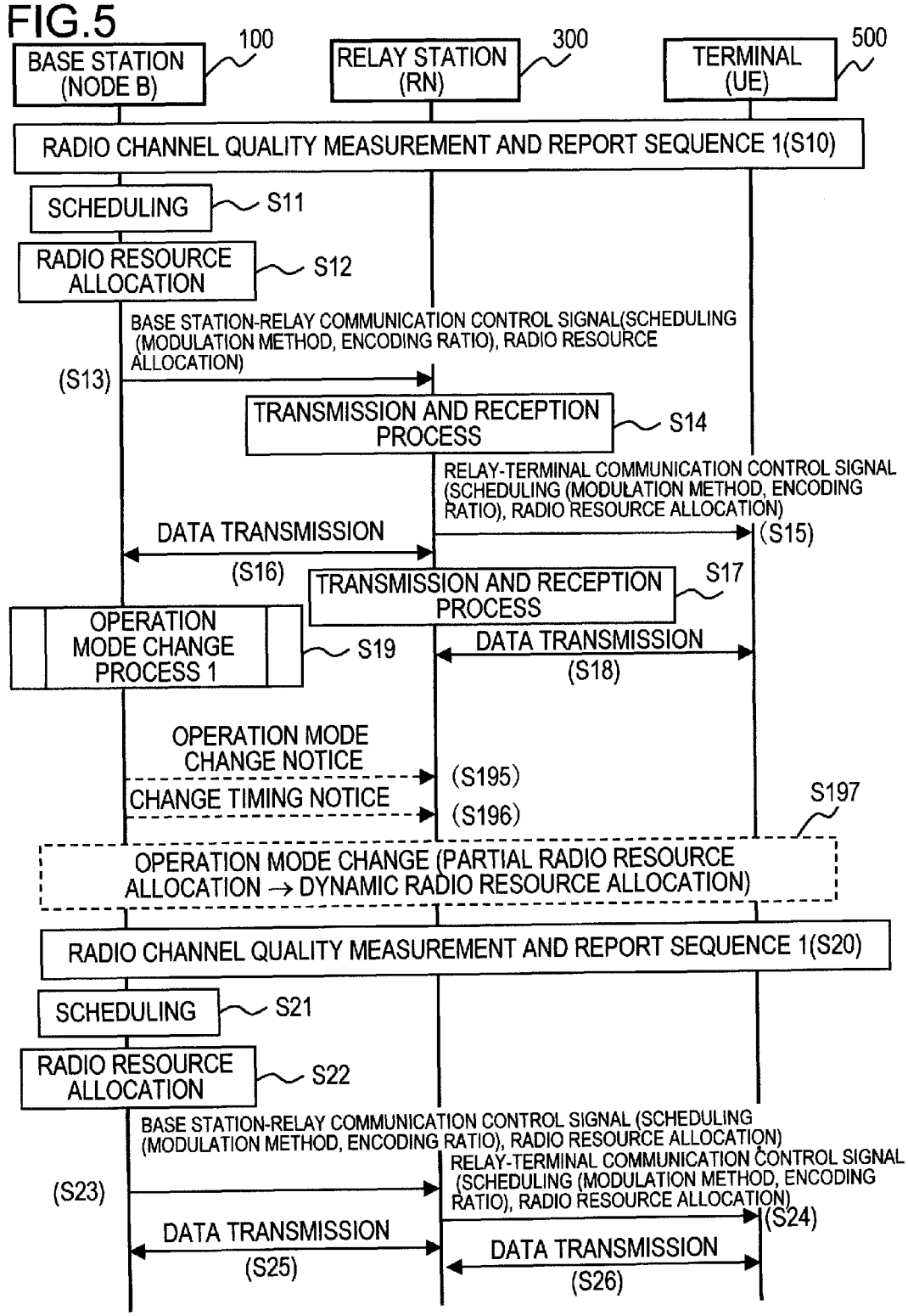
FIG. 5 is a sequence diagram illustrating an operation example.

An operation according to the first embodiment will now be described. FIG. 5 is a sequence diagram illustrating an operation example. In the example illustrated in FIG. 5, the radio resource allocation method is changed from the partial radio resource allocation to the dynamic radio resource allocation.

Figure 6:
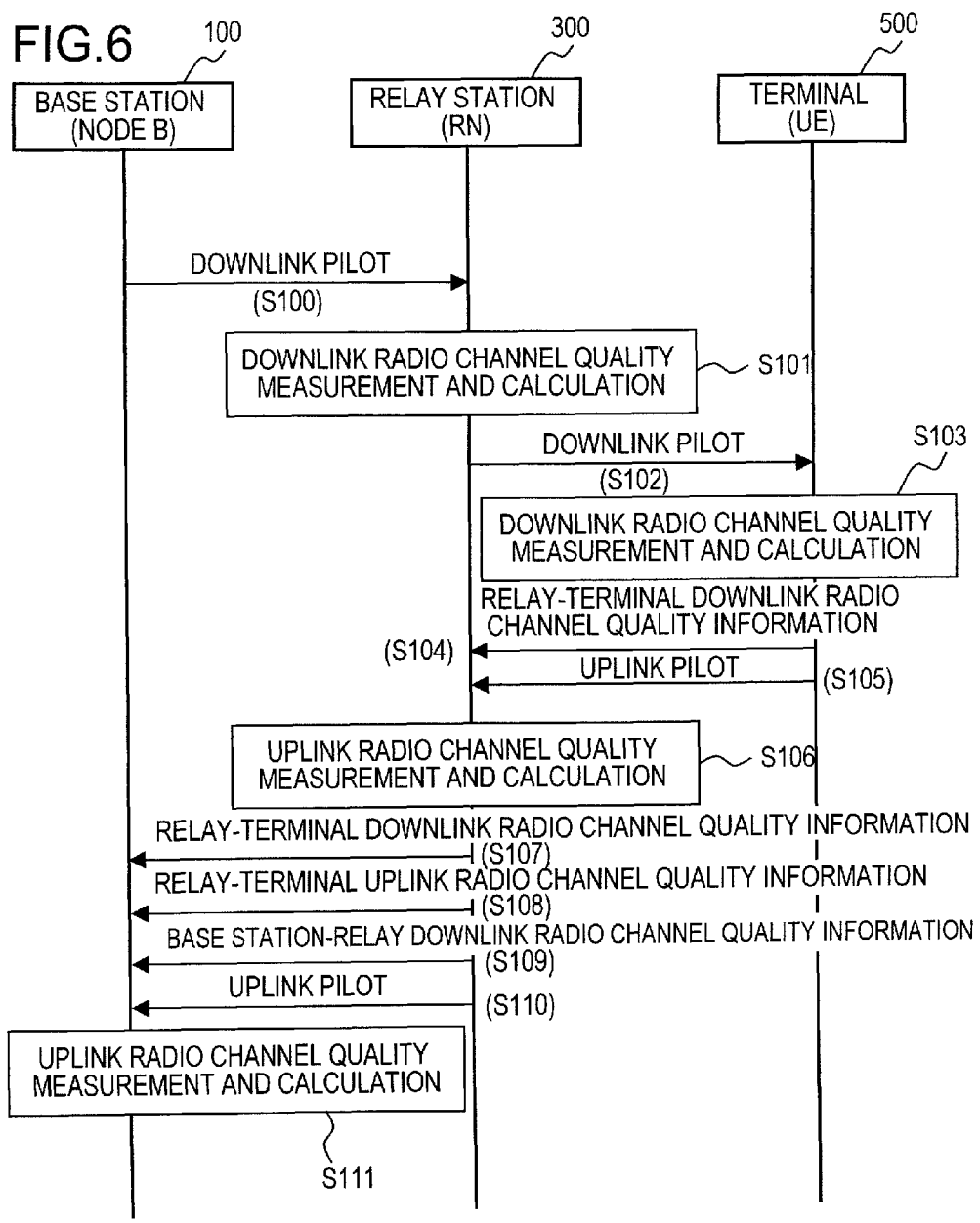
FIG. 6 is a sequence diagram illustrating an operation example.

First the base station 100, the relay station 300 and the terminal 500 execute the radio channel quality measurement and the report sequence (S10). FIG. 6 is a sequence diagram illustrating an example of the radio channel quality measurement and the report sequence 1.

The base station 100 transmits a downlink pilot signal to the relay station 300 (S100). For example, the base station-relay communication control signal generation unit 115 generates the downlink pilot signal.

Then the relay station 300 measures and calculates downlink radio channel quality between the relay station 300 and the base station 100 based on the downlink pilot signal (S101). For example, the downlink radio channel quality measurement unit 318 measures and calculates the radio channel quality.

Then the relay station 300 transmits a downlink pilot signal to the terminal 500 (S101). For example, the relay-terminal communication control signal generation unit 315 generates the downlink pilot signal.

Then the terminal 500 measures and calculates downlink radio channel quality based on the downlink pilot signal (S103). For example, the radio channel quality measurement unit 507 measures and calculates the downlink radio channel quality between the terminal 500 and the relay station 300.

Then the terminal 500 transmits the relay-terminal downlink quality information to the relay station 300 (S104). For example, the radio channel quality information generation unit 508 generates the relay-terminal downlink quality information.

Then the terminal 500 transmits an uplink pilot signal to the relay station 300 (S105). For example, the uplink pilot signal generation unit 511 generates the pilot signal, and transmits the pilot signal.

Then the relay station 300 measures and calculates uplink radio channel quality between the relay station 300 and the terminal 500 based on the uplink pilot signal transmitted from the terminal 500 (S106). For example, the uplink quality calculation unit 308 measures the uplink radio channel quality.

Then the relay station 300 transmits the relay-terminal downlink quality information transmitted from the terminal 500, to the base station 100 (S107). For example, the relay station 300 receives the relay-terminal downlink quality information by the antenna 301, and transmits this information to the base station 100 via the uplink reception radio unit 302, and demodulation and decoding unit 303. The relay-terminal downlink quality extraction unit 307 may extract the relay-terminal downlink quality information.

Then the relay station 300 transmits the calculated relay-terminal uplink quality information (S106) to the base station 100 (S108). For example, the uplink quality information generation unit 309 generates this information, and transmits it to the base station 100.

Then the relay station 300 transmits the calculated base station-relay downlink quality information (S101) to the base station 100 (S109). For example, the downlink radio channel quality information generation unit 319 generates this information, and transmits it to the base station 100.

Then the relay station 300 transmits an uplink pilot signal to the base station 100 (S110). For example, the uplink radio channel quality information generation unit 309 generates the uplink pilot signal, and transmits this signal to the base station 100.

Then the base station 100 measures and calculates uplink radio channel quality between the base station 100 and the relay station 300 based on the uplink pilot (S110) (S111). For example, the base station-relay uplink quality calculation unit 106 measures the uplink radio channel quality.

Then the base station 100 performs scheduling (S11). For example, the scheduler 110 performs scheduling of each radio channel based on each quality information (S107 to S109, S111).

Then the base station 100 allocates the radio resource (S12). For example, the partial allocation control unit 113 allocates the radio resources using a partial radio resource allocation method based on an instruction from the scheduler 110.

FIG. 10(A) and FIG. 10(B) illustrate a radio resource allocation example using the partial radio resource allocation method. In the allocation example in FIG. 10(A), the abscissa is the time axis direction, and the ordinate is the frequency axis direction. As FIG. 10(A) illustrates, the radio frame is divided into a predetermined region for a radio resource between the base station 100 and relay station 300, and a predetermined region for a radio resource between the relay station 300 and terminal 500. The partial allocation control unit 113 allocates each radio resource for the relay station 300 and for the terminals 500 in each region. In the example illustrated in FIG. 10(A), a radio resource is allocated even to a terminal 500 to which the base station 100 directly performs radio communication without passing through the relay station 300. The example in FIG. 10(A) may includes radio resources for both the uplink direction and the downlink direction, or the radio resource in FIG. 10(A) may be allocated for either the uplink direction or the downlink direction.

Then the base station 100 transmits a communication control signal (including a base station-relay communication control signal and a relay-terminal communication control signal), and a partial allocation control signal to the relay station 300 (S13). For example, the partial allocation control signal generation unit 114 generates the partial allocation control signal, and the base station-relay communication control signal generation unit 115 and the relay-terminal communication control signal generation unit 116 generates the communication control signals, and transmits these signals to the base station 100 respectively.

Then the relay station 300 performs transmission and reception process related to the radio communication between the base station 100 and the relay station 300 (S14). For example, the partial allocation control unit 314 controls the uplink transmission radio unit 305 or the downlink reception radio unit 320 so that data can be transmitted or received using the radio resource allocation included in the partial allocation control signal (e.g. FIG. 10(A) and FIG. 10(B)). The communication control signal extraction unit 317 extracts the base station-relay communication control signal, and outputs this control signal to the scheduler 310. Based on this control signal, the scheduler 310 controls the encoding and modulation unit 304 and the demodulation and decoding unit 321, so that the data transmitted from the base station 100 is demodulated, or data to be transmitted to the base station 100 is encoded.

Then a relay-terminal communication control signal and the partial allocation control signal are transmitted to the terminal 500 (S15). For example, the relay-terminal communication control signal generation unit 315 generates the relay-terminal communication control signal. The partial resource allocation control signal is transmitted to the terminal 500 from the demodulation and decoding unit 321 via the encoding and modulation unit 322.

Then the base station 100 and the relay station 300 transmit and receive data to and from each other (S16).

Then the relay station 300 performs transmission and reception process for the radio communication between the relay station 300 and the terminal 500 (S17). For example, the partial allocation control unit 314 controls the downlink transmission radio unit 323 and the uplink reception radio unit 302 so that data can be transmitted to or received from the terminal 500 using the radio resource included in the partial allocation control signal. The scheduler 310 controls the encoding and modulation unit 322 so that encoding is performed based on the relay-terminal communication control signal extracted by the communication control signal extraction unit 317.

Then the relay station 300 and the terminal 500 transmit and receive data to and from each other (S18).

Figure 7:
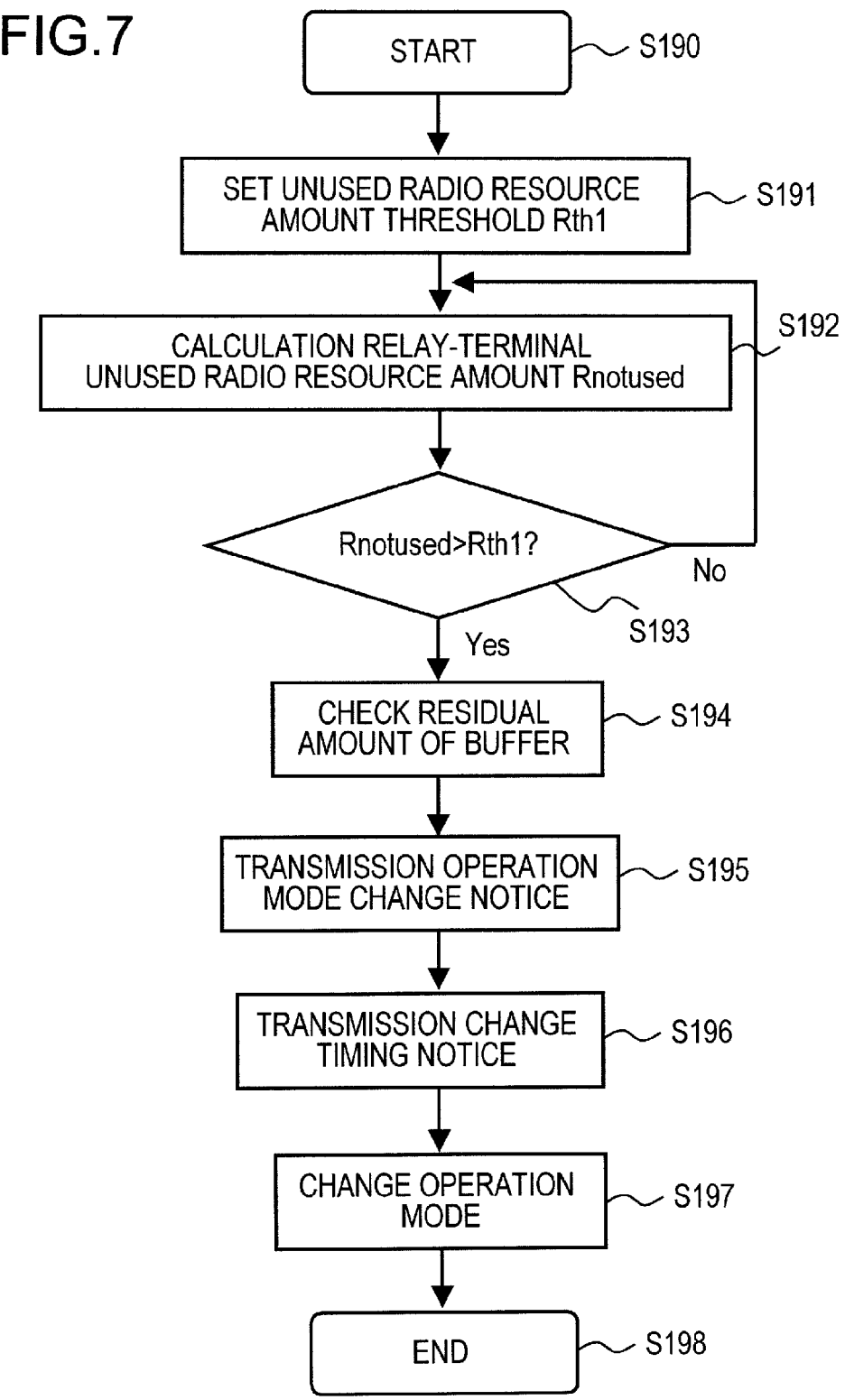
FIG. 7 is a flow chart illustrating an operation example.

Then the base station 100 performs an operation mode change process 1 (S19). FIG. 7 is a flow chart illustrating an operation example of the operation mode change process 1.

When this process is started (S190), the base station 100 sets a threshold Rth1 of the unused radio resource amount (S191). For example, the switching control unit 120 sets the threshold Rth1.

Then the base station 100 calculates a relay-terminal unused radio resource amount Rnotused (S192). For example, the partial allocation control unit 113 outputs information on the allocated radio resource to the switching control unit 120. The switching control unit 113 calculates the unused radio resource amount between the relay station 300 and the terminal 500 based on this information. For example, in the case of the example of FIG. 10(B), the switching control unit 113 calculates a ratio of "Eempty" with respect to all the radio resources.

Then the base station 100 determines whether the unused radio resource amount Rnotused is greater than the threshold Rth1 (S193). For example, this is determined by the switching control unit 120.

If the unused radio resource amount Rnotused is greater than the threshold Rth1 (YES in S193), the base station 100 checks the residual amount of the data buffer of the relay station 300 (S194). For example, the switching control unit 120 calculates a ratio of the radio resource amount allocated to the relay station 300 with respect to all the resources, based on the allocation information from the partial allocation control unit 113, calculates the data amount according to this ratio, and determines the residual amount of the buffer.

Then the base station 100 transmits an operation mode change notice for notifying that the operation mode is changed from the partial radio resource allocation to the dynamic radio resource allocation (S195). For example, the switching control unit 120 instructs the switching control signal generation unit 121 to generate the change notice, and the switching control signal generation unit 121 generates a switching control signal including the change notice, and transmits this signal to the relay station 300. The relay station 300 may transmit the received switching control signal to the terminal 500.

Then the base station 100 calculates the change timing to switch to the dynamic radio resource allocation, and notifies this timing to the relay station 300 (S196). For example, the switching control unit 120 calculates time until the data held by the relay station 300 clears from the buffer based on the residual amount of the buffer of the relay station 300 (S194), and notifies the time as the change timing. The change timing may be included in the switching control signal, for example, according to an instruction from the switching control unit 120 to the switching control signal generation unit 121.

Then the base station 100 and the relay station 300 change the operation mode (S197). For example, when the change timing (S196) activates, the switching control unit 120 of the base station 100 changes the operation mode to the dynamic radio resource allocation, turns the power of the partial allocation control unit 113 OFF, and turns the power of the dynamic allocation control unit 111 ON. When the change timing activates, the switching control signal extraction unit 316 of the relay station 300 turns the power of the partial allocation control unit 314 OFF, and turns the power of the dynamic allocation control unit 312 ON.

Then a series of processes ends (S198).

If the relay-terminal unused radio resource amount Rnotused is the threshold Rth1 or less (NO in S193), on the other hand, the base station 100 performs the process in S192 again.

After the operation mode is changed, the base station 100, the relay station 300 and the terminal 500 executes the radio channel quality measurement and report sequence 1 (S20 in FIG. 5).

Then the base station 100 performs scheduling based on the radio channel quality (S21), and performs dynamic radio resource allocation (S22). For example, the dynamic allocation control unit 111 dynamically allocates the radio resource between the base station 100 and the relay station 300 and the radio resource used for the radio communication between the relay station 300 and the terminal 500, without allocating each radio resource within the pre-divided region. FIG. 11 illustrates an allocation example according to the dynamic radio resource allocation. As FIG. 11 illustrates, the radio resource, used for the radio communication between the base station 100 and the relay station 300, is allocated in a random region.

Then the base station 100 transmits the communication control signal based on the scheduling (S21) and the allocation control signal based on the dynamic radio resource allocation, to the relay station 300 (S23). For example, the dynamic allocation control signal generation unit 112 generates the dynamic allocation control signal based on the information on the radio resource allocation which is output from the dynamic allocation control unit 111, and transmits this signal to the relay station 300.

Then the relay station 300 transmits the dynamic allocation control signal and the relay-terminal communication control signal to the terminal 500 (S24). For example, the dynamic allocation control signal is output from the demodulation and decoding unit 321 to the encoding and modulation unit 322, and is transmitted to the terminal 500. The relay-terminal communication control signal is transmitted from the relay-terminal communication control signal generation unit 315 to the terminal 500 based on the scheduling by the scheduler 310 (S21).

Then the base station 100 and the relay station 300 transmits/receives data based on the base station-relay communication control signal and the dynamic allocation control signal (S25).

Then the relay station 300 and the terminal 500 transmit and receive data to and from each other based on the relay-terminal communication control signal and the dynamic allocation control signal (S26).

According to the first embodiment described above, if the amount of the unused radio resources, out of the radio resource allocated for the communication between the relay station 300 and the terminal 500, is greater than the threshold (YES in S193), the base station 100 determines that the radio resources are not effectively used by the amount of the unused radio resource. Hence the base station 100 changes the allocation method from the partial radio resource allocation (e.g. FIG. 10(A)) to the dynamic radio resource allocation (e.g. FIG. 11). Thereby as FIG. 11 illustrates, the unused radio resource steps down and the radio resource can be allocated for other radio communication, and as a result the radio resource can be effectively used.

Figure 8:
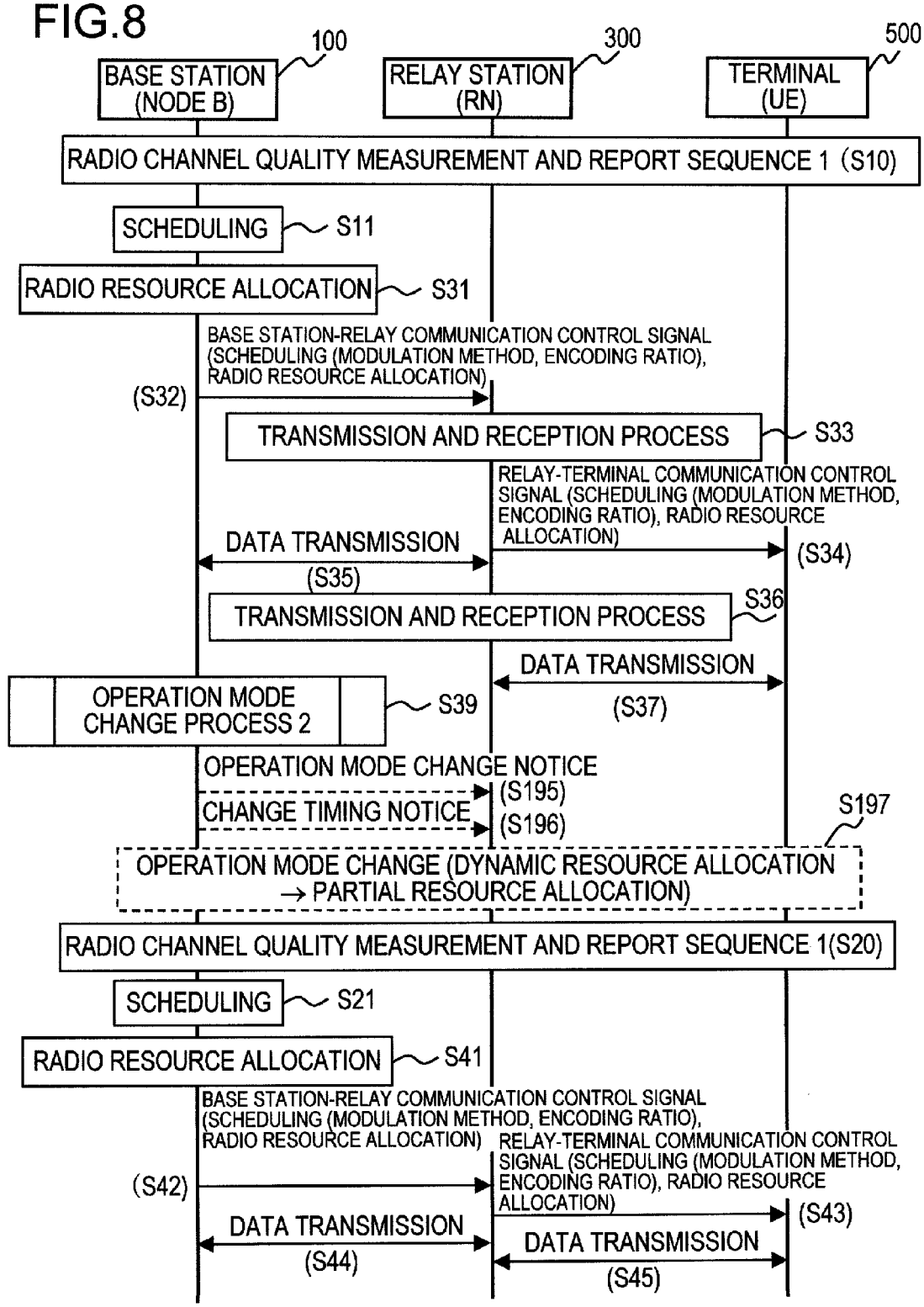
FIG. 8 is a sequence diagram illustrating an operation example.

FIG. 8 illustrates a sequence example when the operation mode is changed from the dynamic radio resource allocation to the partial radio resource allocation.

First the base station 100, the relay station 300 and the terminal 500 execute the radio channel quality measurement and the report sequence 1, just like the example in FIG. 5 (S10).

Then the base station 100 performs scheduling based on the measured radio channel quality (S11), and allocates the radio resources using dynamic radio resource allocation (S31). For example, the dynamic allocation control unit 111 allocates radio resources, as illustrated in FIG. 11.

Then the base station 100 transmits a communication control signal (including a base station-relay communication control signal and a relay-terminal communication control signal) and a dynamic allocation control signal to the relay station 300 (S32).

Then the relay station 300 performs transmission and reception process on the radio communication between the base station 100 and the relay station 300 (S33). For example, the dynamic allocation control unit 312 controls the uplink transmission radio unit 305 or the downlink reception radio unit 320 using the radio resource included in the allocation control signal, so that data can be transmitted to or received from the base station 100.

Then the relay station 300 transmits the relay-terminal communication control signal and the dynamic allocation control signal to the terminal 500 (S34). For example, the dynamic allocation control signal is transmitted from the demodulation and decoding unit 321 to the terminal 500 via the encoding and modulation unit 322.

Then the base station 100 and the relay station 300 transmit or receive the data to or from each other (S35).

Then the relay station 300 performs the transmission and reception process on the radio communication between the relay station 300 and the terminal 500 (S36). For example, the dynamic allocation control unit 312 controls the downlink transmission radio unit 323 or the uplink reception radio unit 302 using the radio resource included in the allocation control signal, so that data can be transmitted or received from the terminal 500.

Then the relay station 300 and the terminal 500 transmit or receive the data to/from each other (S37).

Figure 9:
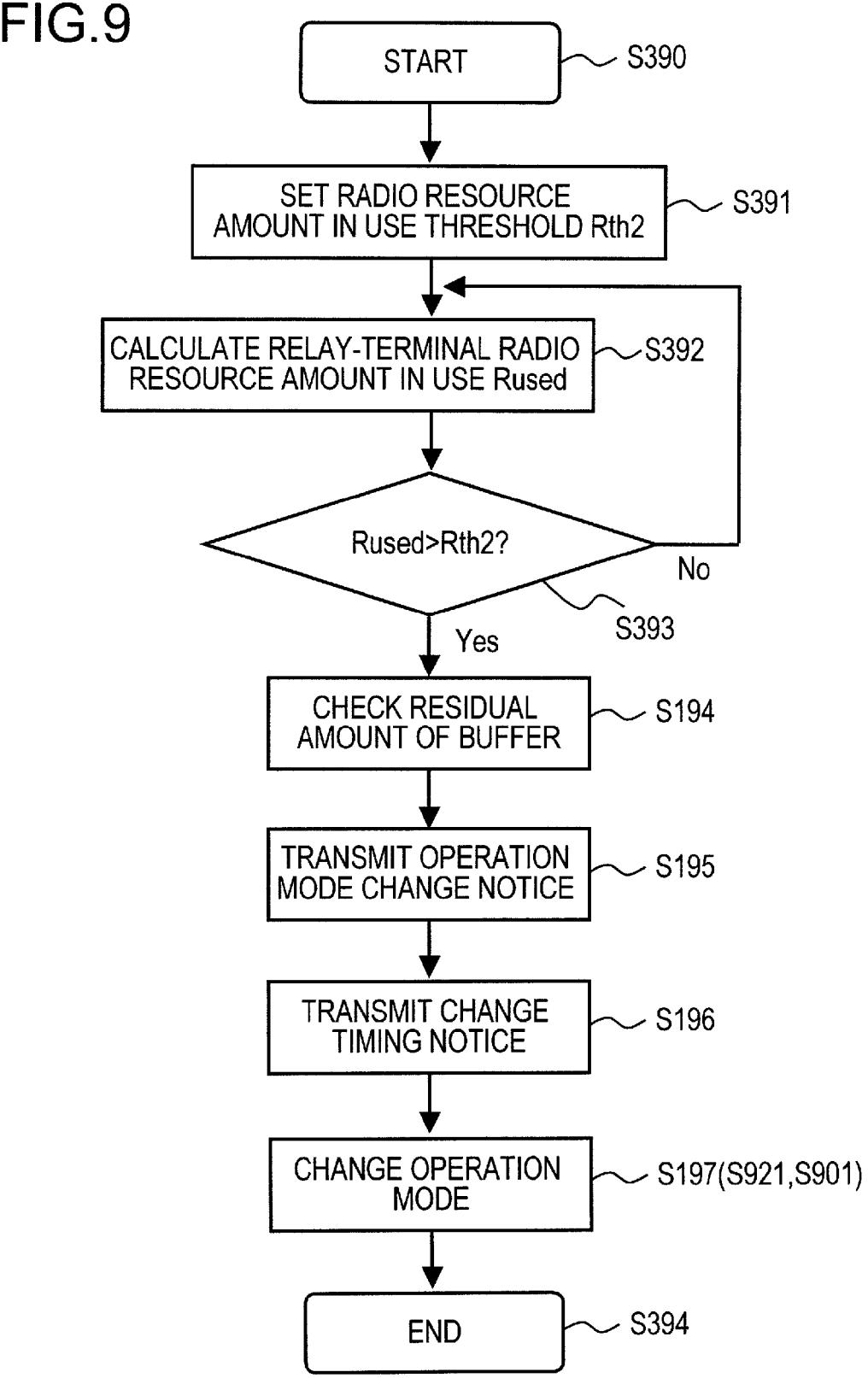
FIG. 9 is a flow chart illustrating an operation example.

Then base station 100 executes the operation mode change process 2 (S39). FIG. 9 is a flow chart illustrating the operation example of the operation mode change process 2.

When this process is started (S390), the base station 100 sets a used radio resource amount threshold Rth2 (S391). For example, the switching control unit 120 sets the threshold Rth2.

Then the base station 100 calculates relay-terminal used radio resource amount Rused (S392). For example, the switching control unit 120 inputs information on the dynamic radio resource allocation (e.g. FIG. 11) from the dynamic allocation control unit 111, and calculates the ratio of the radio resource allocated to the communication between the relay and the terminal, with respect to all the radio resources.

Then the base station 100 determines whether the used radio resource amount Rused is greater than the threshold Rth2 (S393). This, for example, is determined by the switching control unit 120.

If the used radio resource amount Rused is greater than the threshold Rth2 (YES in S393), the base station 100 checks the residual amount of the buffer of the relay station 300 (S194).

Hereafter just like the example in FIG. 7, the base station 100 transmits the operation mode change notice, notifies the change timing based on the residual amount of the buffer, and changes the operation mode at this timing (S195 to S197). In this case, the operation mode is changed from the dynamic radio resource allocation to the partial radio resource allocation.

Then the base station 100 ends the operation mode change process 2 (S392). If the used radio resource amount Rused is the threshold Rth2 or less (NO in S393), on the other hand, the base station 100 performs the process in S392 again.

After the operation mode is changed, the base station 100 executes the radio channel quality measurement and report sequence 1 (S20), and the base station 100 performs scheduling (S21). Then just like S12 to S18 in FIG. 5, the base station 100 allocates the radio resources using the partial radio resource allocation (S41), transmits the communication control signal and the partial allocation control signal (S42, S43), and transmits/receives the data (S44, S45).

According to the first embodiment described above, if the relay-terminal resource is greater than the threshold (YES in S393), it is likely that the radio resource between the relay station 300 and the terminal 500 is more than the other radio resource. In this case, the base station 100 changes the dynamic radio resource allocation to the partial radio resource allocation, whereby the radio resource used for the communication between the relay station 300 and the terminal 500 is sufficiently allocated to a predetermined region, and the radio resources can be used effectively.

Second Embodiment

The second embodiment will now be described. In the second embodiment, the operation mode is changed according to a number of terminals. Construction examples of the base station 100, the relay station 300 and the terminal 500 are the same as the first embodiment (FIG. 2 to FIG. 4).

Figure 12:
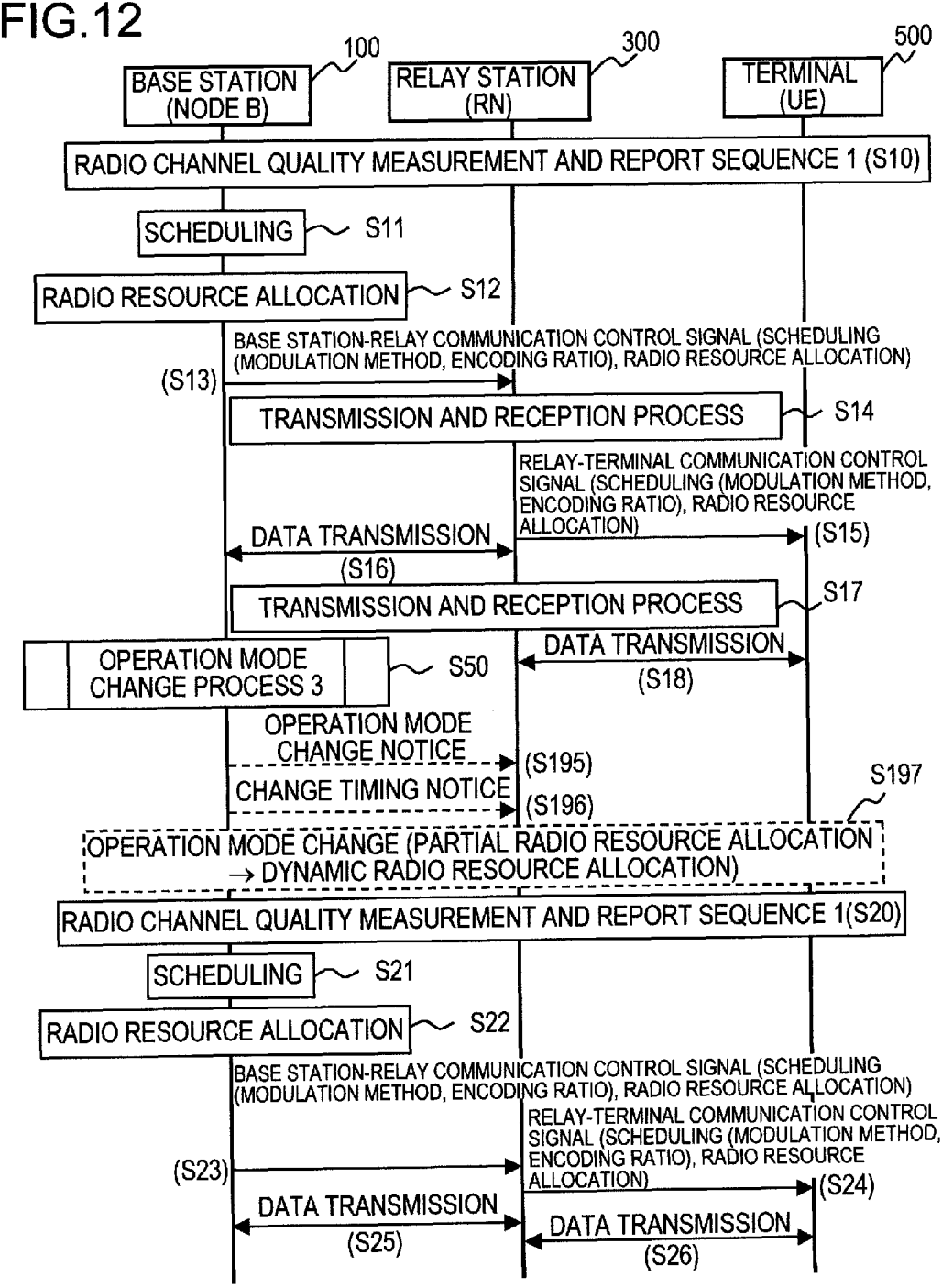
FIG. 12 is a sequence diagram illustrating an operation example.
Figure 13:
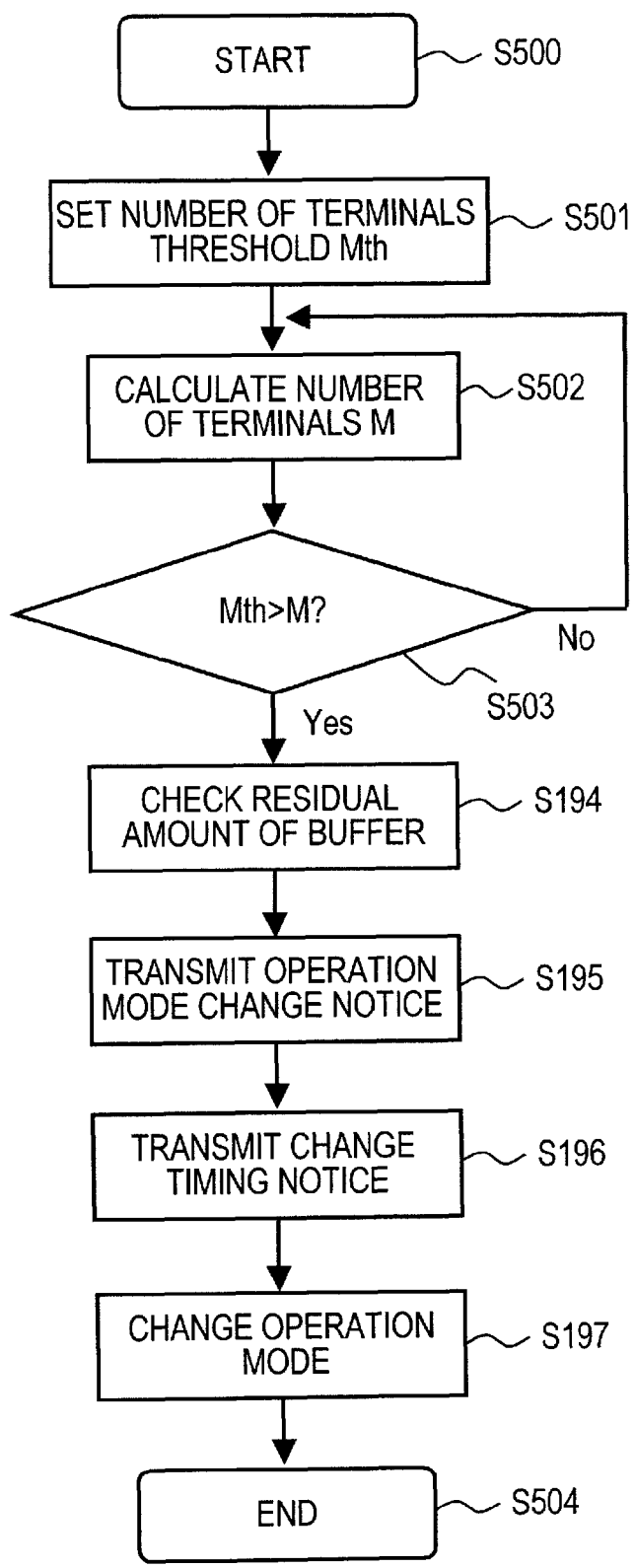
FIG. 13 is a flow chart illustrating an operation example.

FIG. 12 is a sequence diagram illustrating an operation example. S10 to S18 are the same as the first embodiment. The base station 100 executes an operation mode change process 3 (S50). FIG. 13 is a flow chart illustrating the operation example of the operation mode change process 3.

When this process is started (S500), the base station 100 sets a number of terminals threshold Mth (S501). For example, the switching control unit 120 sets the threshold Mth.

Then the base station 100 calculates a number of terminals M to be connected with the relay station 300 (S502). For example, the switching control unit 120 calculates the number of terminals M by determining a number of relay-terminal radio quality information (e.g. CQI) transmitted (or reported) to the base station 100. For example, the scheduler 110 inputs the relay-terminal downlink quality information from the relay-terminal downlink quality extraction unit 105, so the switching control unit 120 calculates the number of terminals M by outputting the number of input times of this information to the switching control unit 120. Alternately, the scheduler 110 may output an input number of the relay-terminal uplink quality information to the switching control unit 120. The scheduler 110 may also output an average number of relay-terminal downlink (or uplink) quality information inputs during a predetermined period to the switching control unit 120.

Then the base station 100 determines whether the number of terminals M is less than the threshold Mth (S503). For example, this is determined by the switching control unit 120. The threshold Mth may be either a same value as or a different value from the unused radio resource amount threshold Rth1 (S191) or the used radio resource amount Rth2 (S391).

If the number of terminals M is less than the threshold Mth (YES in S503), the base station 100 performs process to change the partial radio resource allocation to the dynamic radio resource allocation (S194 to S197). Then the base station 100 ends the process of the operation mode change process 3 (S504). If the number of terminals M is the threshold or more (NO in S503), the base station 100 executes the process in S502 again. Process thereafter is the same as the first embodiment.

Figure 14:
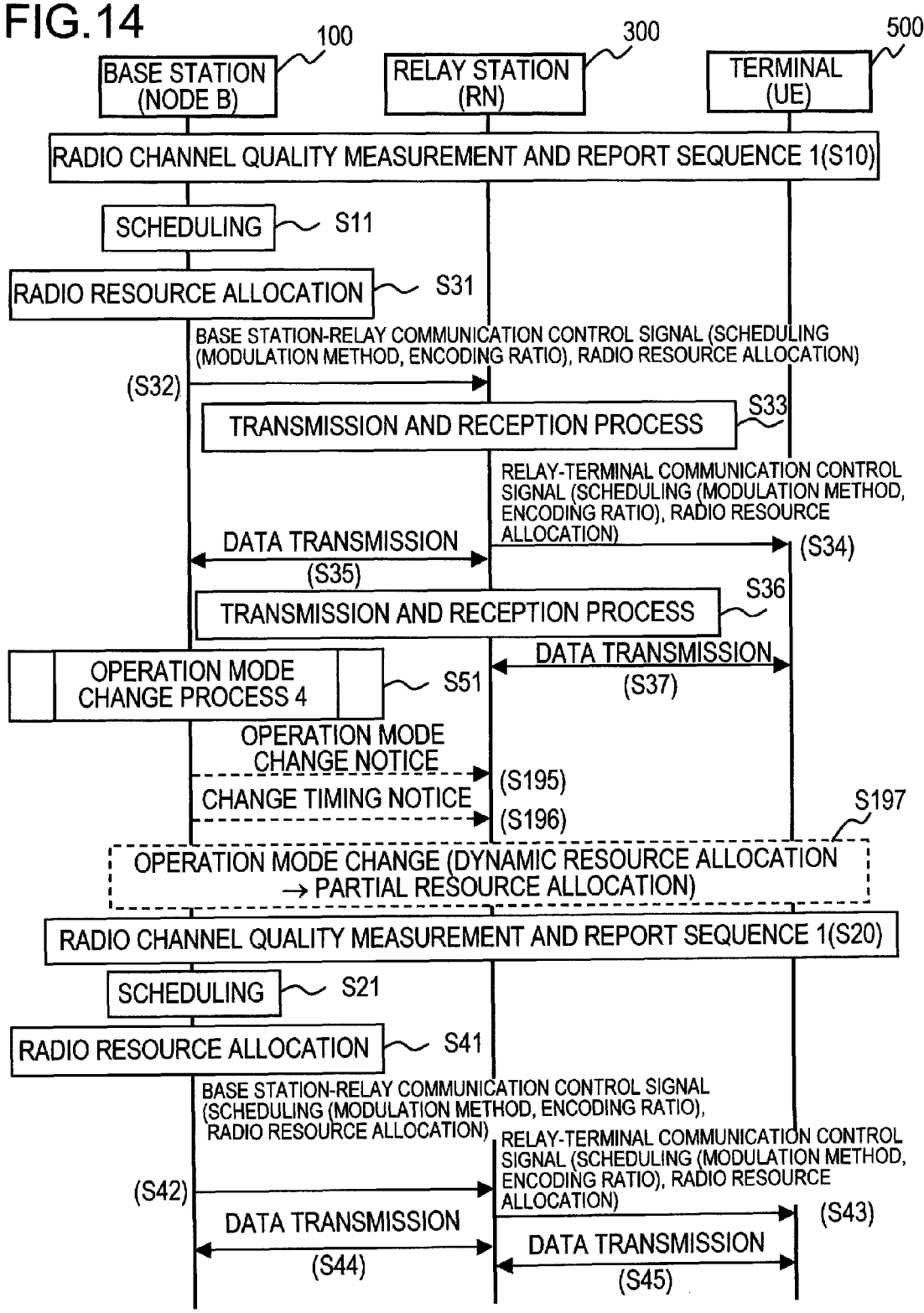
FIG. 14 is a sequence diagram illustrating an operation example.

FIG. 14 illustrates a sequence example when the operation mode is changed from the dynamic radio resource allocation to the partial radio resource allocation. In this case, the base station 100 executes an operation mode change process 4 (S51).

Figure 15:
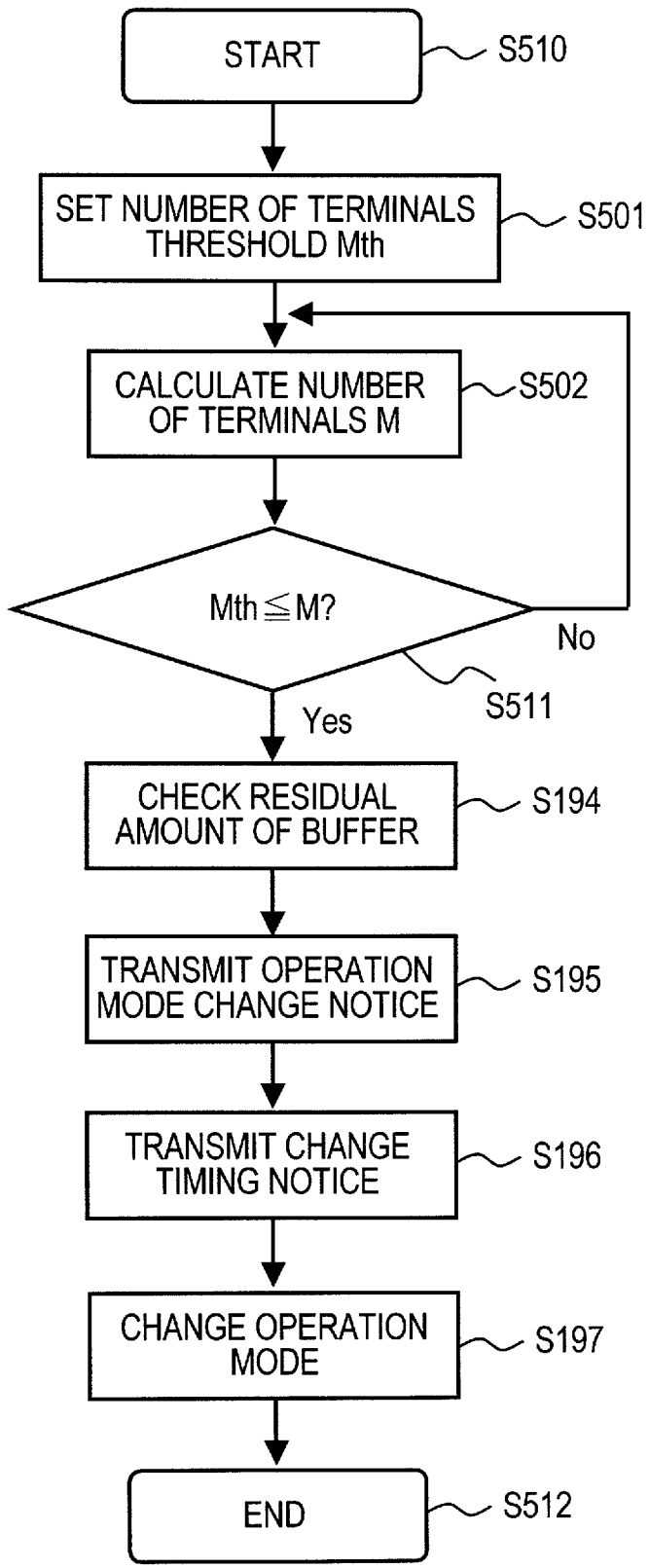
FIG. 15 is a flow chart illustrating an operation example.

FIG. 15 is a flow chart illustrating an operation example of the operation mode change process 4. In this case, if the number of terminals M of the terminals 500, to be connected to the relay station 300, is the threshold Mth or more (YES in S511), the base station 100 changes the dynamic radio resource allocation to the partial resource allocation (S194 to S197).

Then just like the first embodiment, the base station 100 performs such process as the radio channel quality measurement and the report sequence 1 (S20 to S26).

The second embodiment is the same as the first embodiment, except that the number of terminals, instead of the radio resource amount, is used for the operation mode change process, therefore just like the first embodiment, the radio resources can be used effectively.

Third Embodiment

The third embodiment will now be described. In the third embodiment, the distributed scheduling and partial radio resource allocation are changed to the centralized scheduling and dynamic radio resource allocation (or vice versa). In this example, along with the change of the radio resource allocation method, the scheduling method is also changed from the distributed scheduling to the centralized scheduling (or vice versa).

Figure 16:
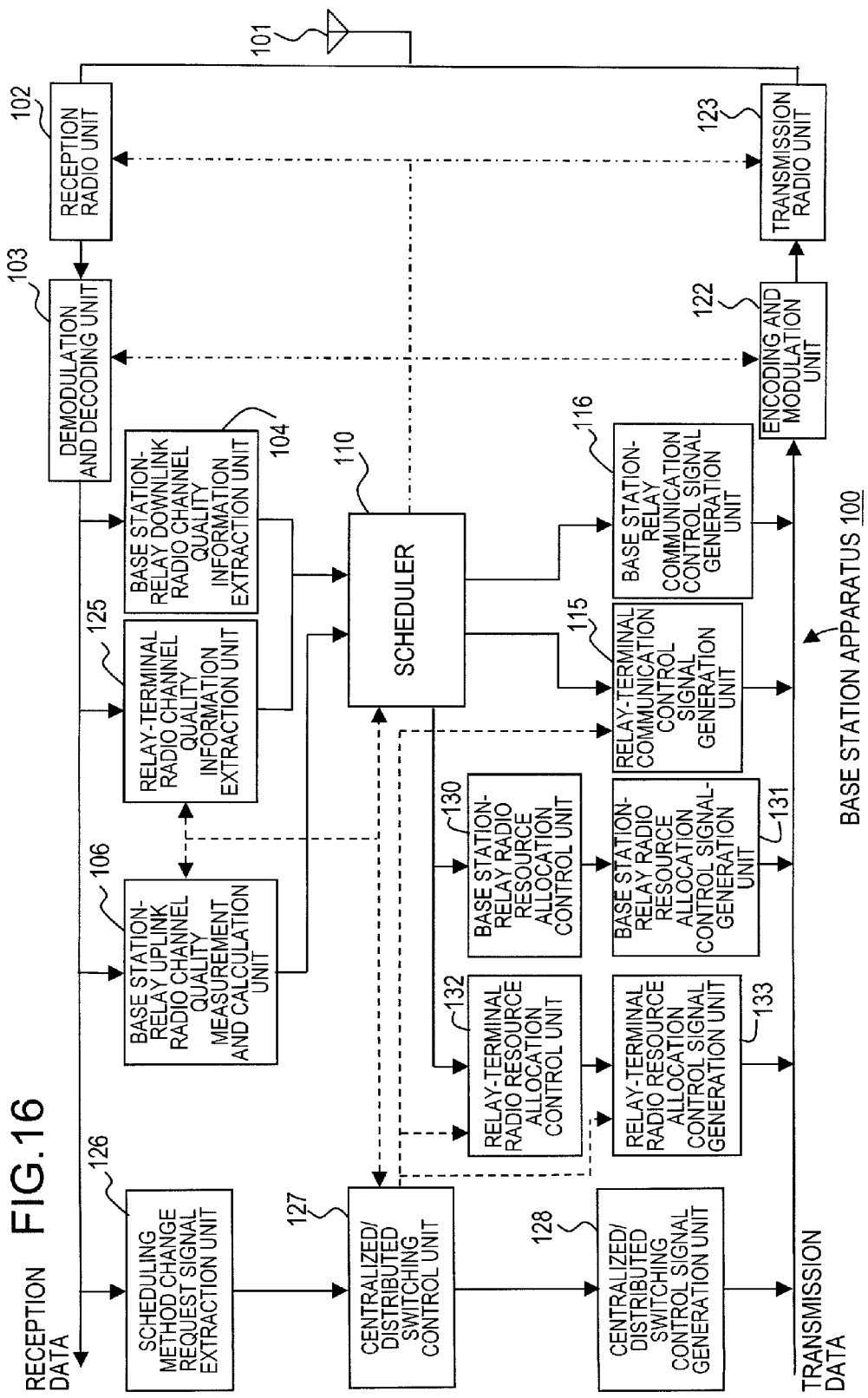
FIG. 16 illustrates a construction example of a base station apparatus.

FIG. 16 illustrates a construction example of the base station 100. The base station 100 further has a relay-terminal radio channel quality information extraction unit (hereafter "relay-terminal quality extraction unit") 125, a scheduling method change request signal extraction unit (hereafter "change request signal extraction unit") 126, a centralized/distributed switching control unit (hereafter "switching control unit") 127, a centralized/distributed switching control signal generation unit (hereafter "switching control signal generation unit") 128, a base station-relay resource allocation control unit (hereafter "base station-relay allocation control unit") 130, a base station-relay radio resource allocation control signal generation unit (hereafter "base station-relay allocation control signal generation unit") 131, a relay-terminal radio resource allocation control unit (hereafter "relay-terminal allocation control unit") 132, and a relay-terminal radio resource allocation control signal generation unit (hereafter "relay-terminal allocation control signal generation unit") 133.

The relay-terminal quality extraction unit 125 extracts relay-terminal downlink quality information measured by the terminal 500, or relay-terminal uplink quality information measured by the relay station 300. The relay-terminal quality extraction unit 125 outputs each extracted radio quality information to the scheduler 110.

The change request signal extraction unit 126 extracts a scheduling method change request signal (or an operation mode change request signal, hereafter "change request signal"), which is transmitted from the relay station 300, and outputs this signal to the switching control unit 127.

According to the change request signal, the switching control unit 127 changes the scheduling method (or operation mode) from the distributed scheduling and partial radio resource allocation to the centralized scheduling and dynamic radio resource allocation (or vice versa). For example, if a scheduling method is switched to the distributed scheduling, the switching control unit 127 turns the power of the relay-terminal allocation control unit 132 and the relay-terminal allocation control signal extraction unit 133 OFF. If a scheduling method is switched to the centralized scheduling, the switching control unit 127 turns the power of these units ON.

When a scheduling method is switched, the switching control signal generation unit 128 generates a switching control signal to indicate a scheduling method to be used after switching. The switching control signal generation unit 128 outputs the switching control signal to the encoding and modulation unit 122.

The base station-relay allocation control unit 130 allocates a radio resource to be used for radio communication between the base station 100 and the relay station 300. Available radio resource allocation methods are: the partial radio resource allocation, and the dynamic radio resource allocation.

The base station-relay allocation control signal generation unit 131 generates a base station-relay allocation control signal based on the radio resource allocated by the base station-relay allocation control unit 130. The base station-relay allocation control signal generation unit 131 outputs the base station-relay allocation control signal to the encoding and modulation unit 122.

The relay-terminal allocation control unit 132 allocates radio resource to be used for the radio communication between the relay station 300 and the terminal 500. Available radio resource allocation methods are: the partial radio resource allocation, and the dynamic radio resource allocation.

The relay-terminal allocation control signal generation unit 133 generates a relay-terminal allocation control signal based on the radio resource allocated by the relay-terminal allocation control unit 132. The relay-terminal allocation control signal generation unit 133 outputs the relay-terminal allocation control signal to the encoding and modulation unit 122.

Figure 17:
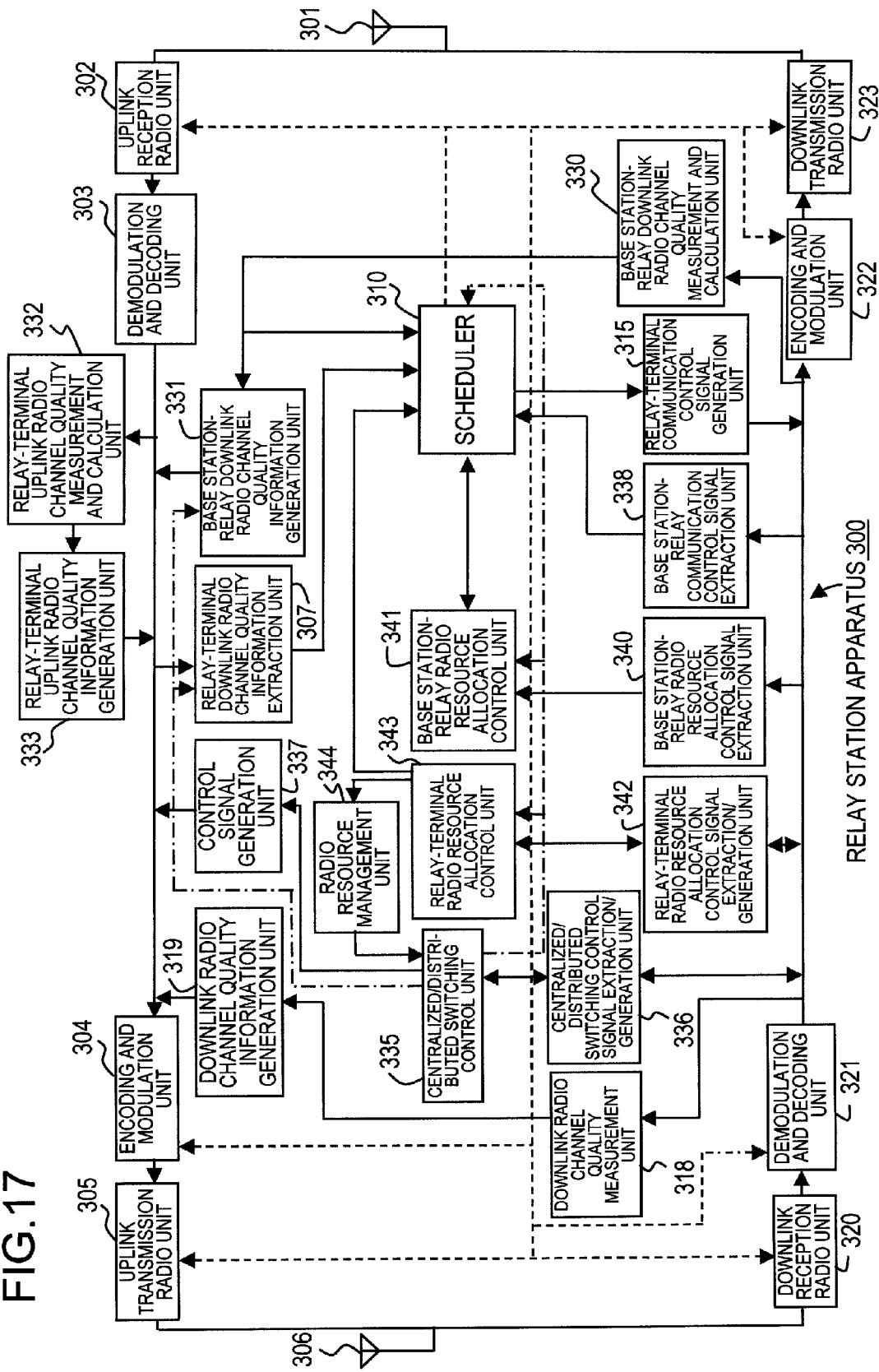
FIG. 17 illustrates a construction example of a relay station apparatus.

FIG. 17 illustrates a construction example of the relay station 300. The relay station 300 further has a base station-relay downlink radio channel quality measurement and calculation unit (hereafter "base station-relay downlink quality calculation unit") 330, a base station-relay downlink radio channel quality information generation unit (hereafter "base station-relay downlink quality information generation unit") 331, a relay-terminal uplink radio channel quality measurement and calculation unit (hereafter "relay-terminal uplink quality calculation unit") 332, a relay-terminal uplink radio channel quality information generation unit (hereafter "relay-terminal uplink quality information generation unit") 333, a centralized/distributed switching control unit (hereafter "switching control unit") 335, a centralized/distributed switching control signal extraction/generation unit (hereafter "switching control signal extraction/generation unit") 336, a control signal generation unit 337, a base station-relay communication control signal extraction unit (hereafter "base station-relay communication control signal extraction unit") 338, a base station-relay radio resource allocation control signal extraction unit (hereafter "base station-relay allocation control signal extraction unit") 340, a base station-relay radio resource allocation control unit (hereafter "base station-relay allocation control unit") 341, a relay-terminal radio resource allocation control signal extraction/generation unit (hereafter "relay-terminal allocation control signal extraction/generation unit") 342, a relay-terminal radio resource allocation control unit (hereafter "relay-terminal allocation control unit") 343 and a radio resource management unit 344.

The base station-relay downlink quality calculation unit 330 measures and calculates radio channel quality in the downlink direction between the base station 100 and the relay station 300 based on a downlink pilot signal, which is transmitted from the base station 100.

The base station-relay downlink quality information generation unit 331 generates the base station-relay downlink quality information from radio channel quality calculated by the base station-relay downlink quality calculation unit 330. The base station-relay downlink quality information generation unit 331 outputs the generated base station-relay downlink quality information to the encoding and modulation unit 304.

The relay-terminal uplink quality calculation unit 332 measures and calculates radio channel quality in the uplink direction between the relay station 300 and the terminal 500 based on the uplink pilot signal transmitted from the terminal 500.

The relay-terminal uplink quality information generation unit 333 generates relay-terminal uplink quality information based on the radio channel quality calculated by the relay-terminal uplink quality calculation unit 332. The relay-terminal uplink quality information generation unit 333 outputs the relay-terminal uplink quality information to the encoding and modulation unit 304.

The switching control unit 335 switches the scheduling method. The switching control unit 335 also determines whether a scheduling method change request is generated, and if this change request is generated, the switching control unit 335 instructs the control signal generation unit 337 to generate a control signal to indicate the change request. The switching control unit 335 also outputs the residual amount of the buffer held in the relay station 300 to the control signal generation unit 337, so that the residual amount of the buffer is included in the change request signal, and is notified to the base station 100.

The switching control signal extraction/generation unit 336 extracts the switching control signal to indicate the scheduling method change notice, which is transmitted from the base station 100, and outputs this signal to the switching control unit 335. The switching control signal extraction/generation unit 336 generates a switching control signal based on an instruction from the switching control unit 335, and outputs this signal to the encoding and modulation unit 322.

The base station-relay communication control signal extraction unit 338 extracts a base station-relay communication control signal transmitted from the base station 100, and outputs this signal to the scheduler 310.

The base station-relay allocation control signal extraction unit 340 extracts a base station-relay allocation control signal transmitted from the base station 100, and outputs this signal to the base station-relay allocation control unit 341.

The base station-relay allocation control unit 341 controls the uplink transmission radio unit 305, or the downlink reception radio unit 320, so that data can be transmitted to or received from the base station 100 using the radio resource included in the base station-relay allocation control signal.

The relay-terminal allocation control signal extraction/generation unit 342 extracts a relay-terminal allocation control signal transmitted from the base station 100, and outputs this signal to the relay-terminal allocation control unit 343. The relay-terminal allocation control signal extraction/generation unit 342 also generates a relay-terminal allocation control signal by an instruction from the relay-terminal allocation control unit 343, and outputs this signal to the encoding and modulation unit 322.

The relay-terminal allocation control unit 343 controls the downlink transmission radio unit 323 or the uplink reception radio unit 302, so that data can be transmitted to or received from the terminal 500 using the radio resource included in the relay-terminal allocation control signal. The relay-terminal allocation control unit 343 also allocates radio resources to the subordinate terminals 500 when the centralized scheduling is switched to the distributed scheduling based on the control by the switching control unit 335. In this case, the relay-terminal allocation control unit 343 outputs information on the allocated radio resource to the relay-terminal allocation control signal extraction/generation unit 342, generates a relay-terminal allocation control signal, and transmits this signal to the terminal 500.

The radio resource management unit 344 manages a radio resource to be used for the radio communication between the relay station 300 and the terminal 500. Details will be described later.

The construction example of the terminal 500 is the same as the first embodiment (e.g. FIG. 4).

Figure 18:
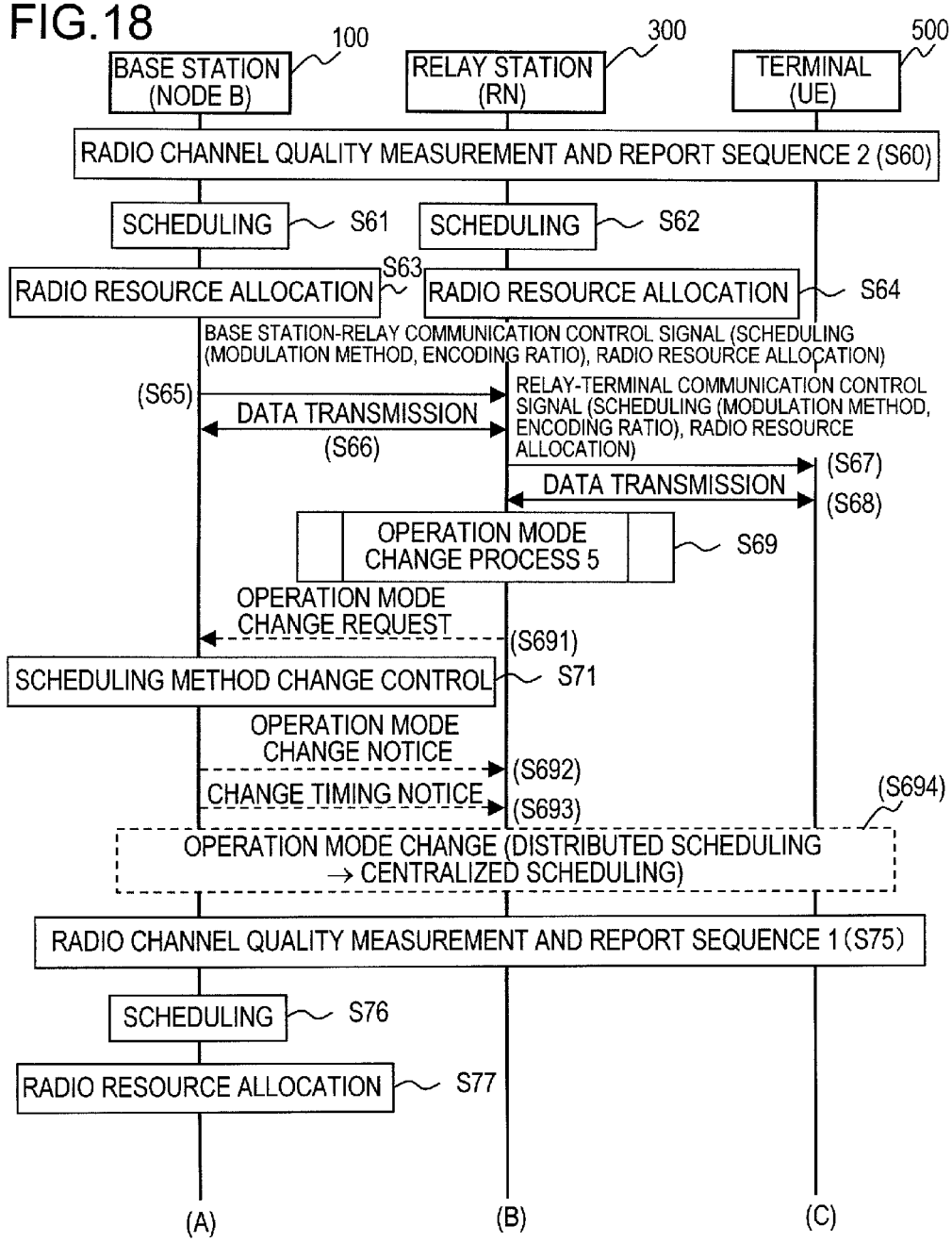
FIG. 18 is a sequence diagram illustrating an operation example.
Figure 19:
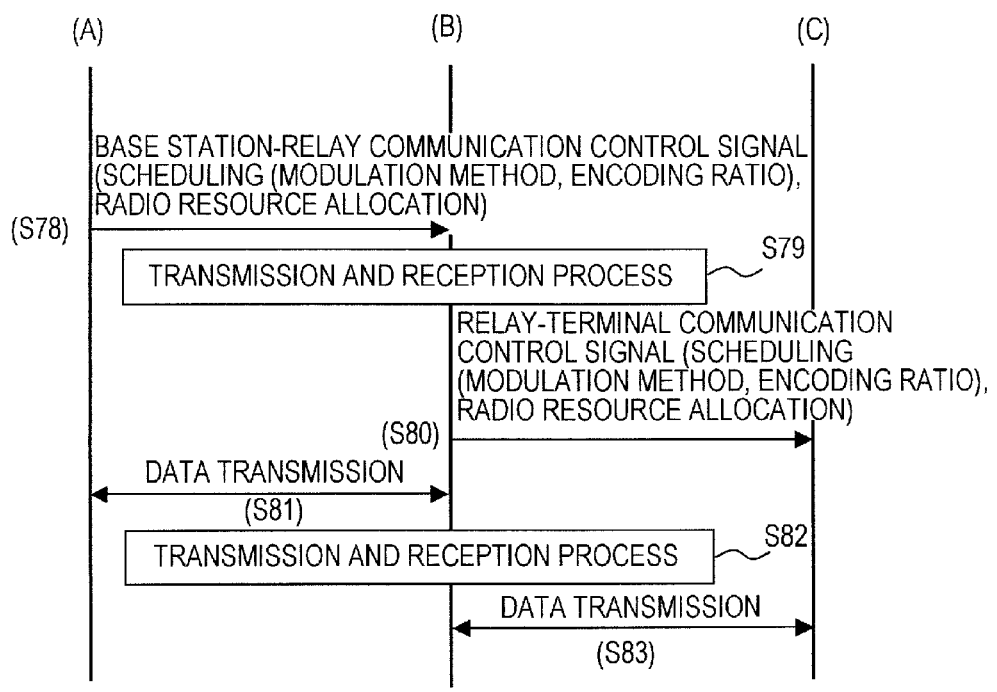
FIG. 19 is a sequence diagram illustrating an operation example.

An operation according to the third embodiment will now be described. FIG. 18 and FIG. 19 are sequence diagrams illustrating an operation example. In the example illustrated in FIG. 18 and FIG. 19, the distributed scheduling (and partial radio resource allocation) is changed to centralized scheduling (and dynamic radio resource allocation).

Figure 20:
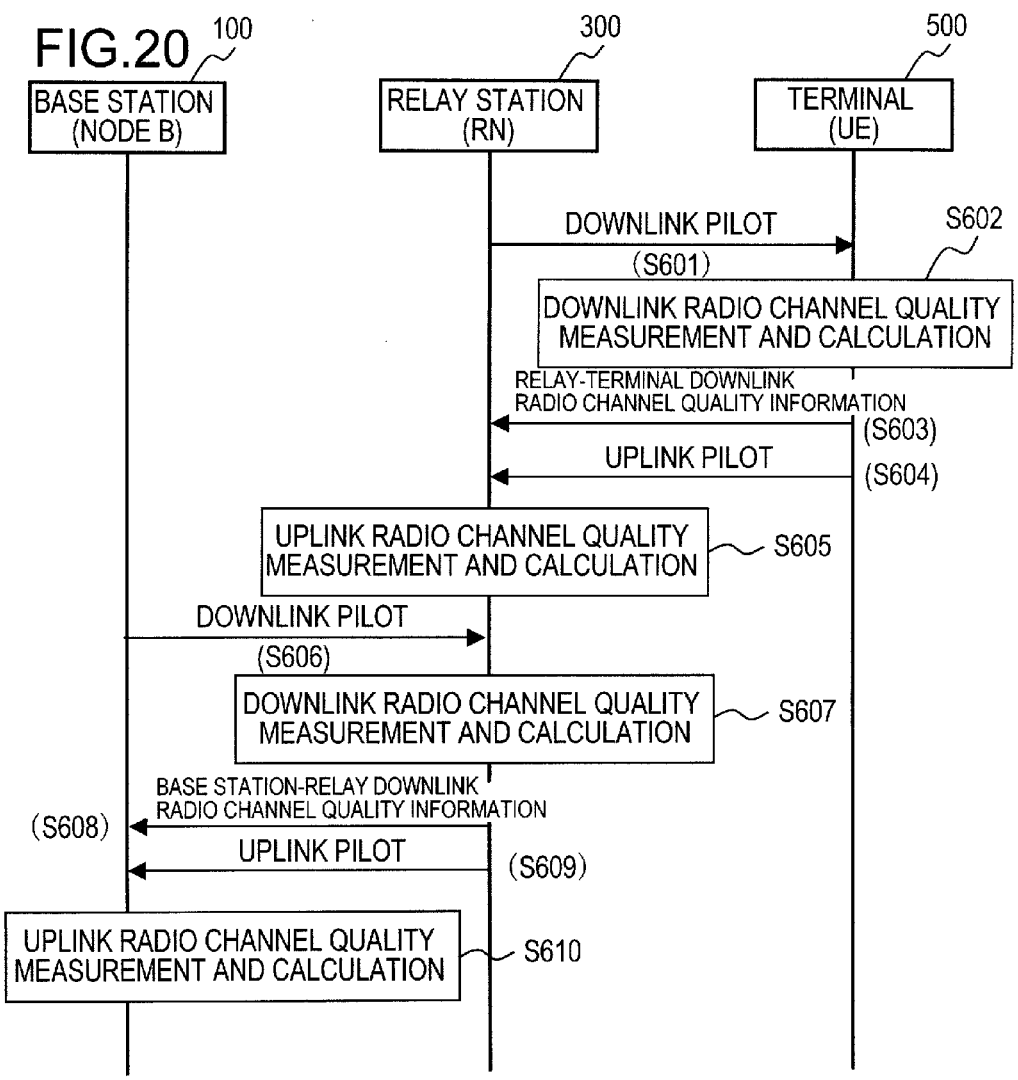
FIG. 20 is a sequence diagram illustrating an operation example.

First the base station 100, the relay station 300 and the terminal 500 execute radio channel quality measurement and a report sequence 2 (S60). FIG. 20 is a sequence diagram illustrating an example of the radio channel quality measurement and the report sequence 2.

The relay station 300 transmits a downlink pilot signal to the terminal 500 (S601). For example, the relay-terminal communication control signal generation unit 315 generates the downlink pilot signal.

Then the terminal 500 measures and calculates downlink radio channel quality in the downlink direction between the terminal 500 and the relay station 300 (S602). For example, the radio channel quality measurement unit 507 measures and calculates the radio channel quality based on the downlink pilot signal.

Then the terminal 500 transmits relay-terminal downlink quality information to the relay station 300 (S603). For example, the radio channel quality information generation unit 508 generates the relay-terminal downlink quality information based on the radio channel quality measured by the radio channel quality measurement unit 507, and transmits this information.

Then the terminal 500 transmits an uplink pilot signal to the relay station 300 (S604). For example, the uplink pilot signal generation unit 511 generates the uplink pilot signal, and transmits this signal.

Then the relay station 300 measures and calculates radio channel quality in the uplink direction between the relay station 300 and the terminal 500 based on the uplink pilot signal (S605). For example, the relay-terminal uplink quality calculation unit 332 measures and calculates the radio channel quality.

Then the relay station 100 transmits a downlink pilot signal to the relay station 300 (S606). For example, the base station-relay communication control signal generation unit 115 generates the downlink pilot signal, and transmits this signal.

Then the relay station 300 measures and calculates radio channel quality in the downlink direction between the base station 100 and the relay station 300 based on the downlink pilot signal from the base station 100 (S607). For example, the base station-relay downlink quality calculation unit 330 measures and calculates the radio channel quality.

Then the relay station 300 transmits base station-relay downlink quality information to the base station 100 (S608). For example, the base station-relay downlink quality information generation unit 331 generates and transmits this quality information.

Then the relay station 300 transmits an uplink pilot signal to the base station 100 (S609). For example, the control signal generation unit 337 generates the uplink pilot signal, and transmits this signal.

Then the base station 100 calculates radio channel quality in the uplink direction between the base station 100 and the relay station 300 based on the uplink pilot signal (S610). For example, the base station-relay uplink quality calculation unit 106 measures and calculates the radio channel quality.

Then the base station 100 and the relay station 300 perform the distributed scheduling based on each radio channel quality (S61, S62 in FIG. 18). The base station 100 performs scheduling for the relay station 300 and the subordinate terminals. The relay station 300 performs scheduling for the subordinate terminals 500. Schedulers 110 and 310 perform the scheduling.

Then the base station 100 and the relay station 300 allocate radio resources (S62, S63). The base station 100 and the relay station 300 allocate radio resources based on the partial radio resource allocation. For example, the base station-relay allocation control unit 130 and the relay-terminal allocation control unit 343 allocate radio resources respectively.

Then the base station 100 transmits a base station-relay communication control signal and a base station-relay allocation control signal to the relay station 300 (S65). For example, the base station-relay communication control signal generation unit 115 generates and transmits the base station-relay communication control signal, and the base station-relay allocation control signal generation unit 131 generates and transmits the base station-relay allocation control signal.

Then the base station 100 and the relay station 300 transmit and receive data to and from each other (S66).

Then the relay station 300 transmits a relay-terminal communication control signal and a relay-terminal allocation control signal to the terminal 500 (S67). For example, the relay-terminal communication control signal generation unit 315 generates and transmits the relay-terminal communication control signal, and the relay-terminal allocation control signal extraction/generation unit 342 generates and transmits the relay-terminal allocation control signal.

Then the relay station 300 and the terminal 500 transmit and receive data to/from each other (S68).

Figure 21:
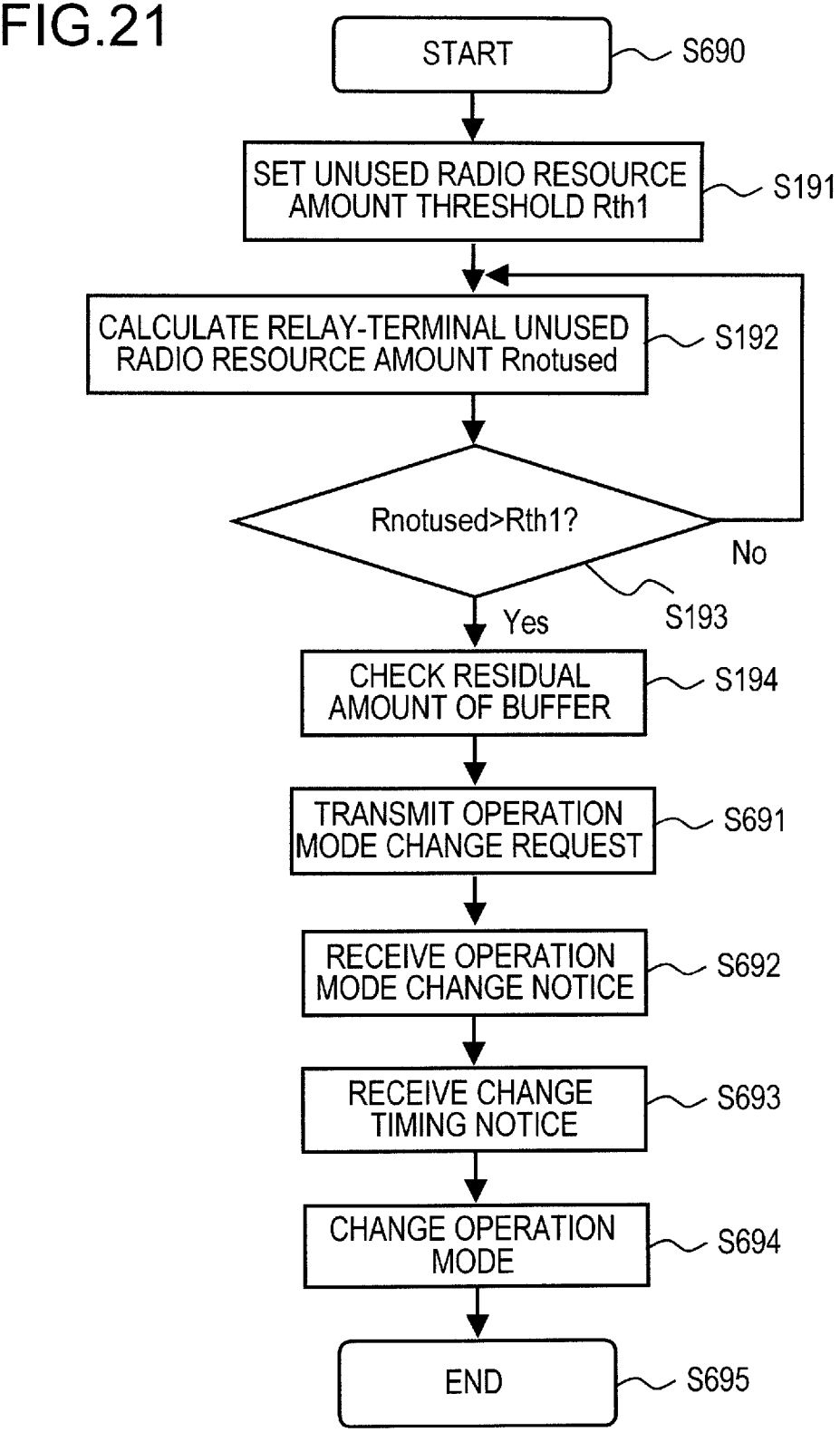
FIG. 21 is a flow chart illustrating an operation example.

Then the relay station 300 performs an operation mode change process 5 (S69). FIG. 21 is a flow chart illustrating an example of the operation mode change process.

When this process starts (S690), the relay station 300 sets an unused radio resource amount threshold Rth1 (S191), calculates a relay-terminal unused radio resource amount Rnotused (S192), and determines whether the unused radio resource amount Rnotused is greater than the threshold Rth1 (S193). For example, the radio resource management unit 344 calculates a ratio of the radio resource allocated by the relay-terminal allocation control unit 343 with respect to all the radio resources, and outputs the calculated amount to the switching control unit 335. Then the threshold Rth1, which is set by the switching control unit 335, and the calculated amount, are compared.

If the unused radio resource amount Rnotused is greater than the threshold Rth1, the relay station 300 checks the residual data amount of the buffer held in the relay station 300 (S194). For example, the radio resource management unit 344 calculates data amount based on the radio resource amount allocated to the communication between the relay station 300 and the terminal 500, and outputs this data amount to the switching control unit 335. Thereby the switching control unit 335 checks the residual amount of the buffer.

Then the relay station 300 transmits an operation mode change request to the base station 100 (S691). For example, the control signal generation unit 337 generates and transmits a control signal which includes this change request. The control signal generation unit 337 includes the residual amount of the buffer in the control signal to generate this signal.

When this operation mode change request is received, the base station 100 performs the scheduling method change control (S71 in FIG. 18). For example, the change request signal extraction unit 126 extracts a control signal which generates the change request. Based on the extracted control signal, the switching control unit 127 instructs to generate a switching control signal to indicate that the scheduling method is changed from the distributed scheduling to the centralized scheduling. The switching control unit 127 determines an operation mode change timing based on the residual amount of the buffer notified by the relay station 300, and outputs this timing to the switching control signal generation unit 128. The switching control signal generation unit 128 generates a switching control signal which includes the operation mode change timing and the change request, and transmits this signal to the relay station 300.

The relay station 300 receives the switching control signal (or the operation mode change notice) (S692), and receives the change timing (S693). For example, the switching control signal extraction/generation unit 336 receives the operation mode change notice and the change timing by extracting the switching control signal.

Then at the change timing, the base station 100 and the relay station 300 change the operation mode to the centralized scheduling (and dynamic radio resource allocation) (S694). For example, at the change timing, the switching control unit 127 turns the power of the relay-terminal allocation control unit 132, the relay-terminal allocation control signal generation unit 133 and the relay-terminal communication control signal generation unit 116 OFF. The switching control unit 335 also turns the power of the relay-terminal allocation control unit 343 and the relay-terminal allocation control signal extraction/generation unit 342 OFF.

Then the relay station 300 ends the operation mode change process 5 (S695).

After the scheduling method is changed from the distributed scheduling to the centralized scheduling, the base station 100, the relay station 300 and the terminal 500 execute the radio channel quality measurement and the report sequence 1 (S75). The radio channel quality measurement and report sequence 1 are the same as the first embodiment (e.g. FIG. 6).

Then the base station 100 performs a centralized scheduling based on each radio channel quality (S76), and performs the dynamic radio resource allocation (S77).

Then the base station 100 transmits a communication control signal and a allocation control signal to the relay station 300 (S78), and a relay station 300 performs transmission and reception process based on the communication control signal and the allocation control signal (S79). Then the base station 100 and the relay station 300 transmit and receive data to and from each other (S81).

The relay station 300, on the other hand, transmits a relay-terminal communication control signal and a relay-terminal allocation control signal to the terminal 500 (S80), performs transmission and reception process (S82), and transmits and receives data (S83).

As described above, according to the third embodiment, if the unused radio resource amount for the communication between the relay station 300 and the terminal 500 is greater than the threshold (YES in S193), the radio resource allocation method is changed from the partial radio resource allocation to the dynamic radio resource allocation. The scheduling method is also changed from the distributed scheduling to the centralized scheduling. Since the radio resource allocation method is changed to the dynamic radio resource allocation, the radio resources can be effectively used, just like the first embodiment.

Figure 22:
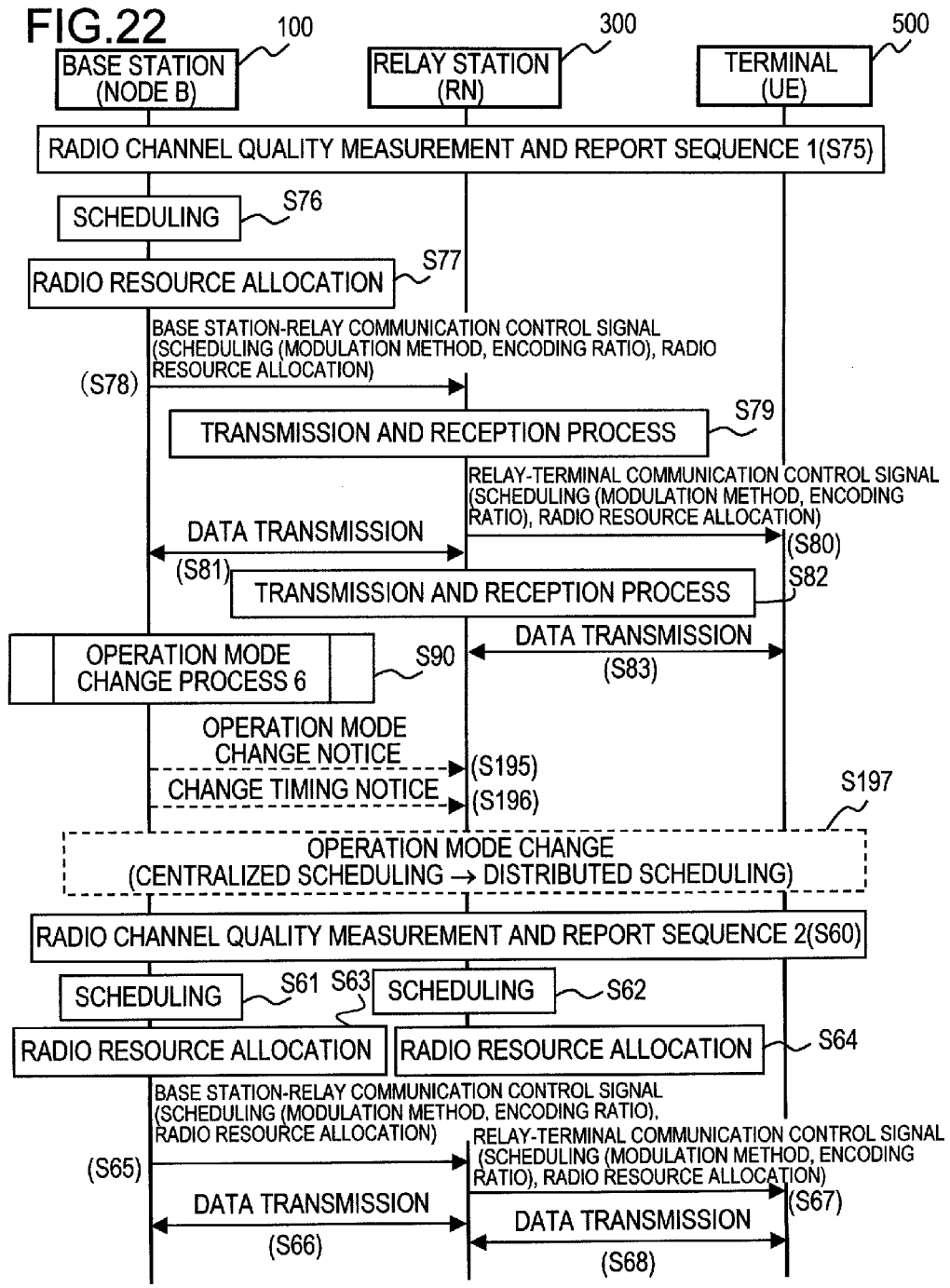
FIG. 22 is a sequence diagram illustrating an operation example.

FIG. 22 illustrates a sequence example when the operation mode is changed from the centralized scheduling (and dynamic radio resource allocation) to the distributed scheduling (and partial radio resource allocation).

In the sequence example illustrated in FIG. 22, the base station 100 performs the centralized scheduling (S76 to S78), and transmits and receives data (S79 to S83). The base station 100 performs an operation mode change process 6 (S90).

The operation mode change process 6 is the same as the operation mode process 2 of the first embodiment (e.g. FIG. 9). If the relay-terminal used radio resource amount Rused is greater than the threshold Rth2, (YES in S393), the base station 100 transmits an operation mode change notice and a change timing notice to the relay station 300 (S195, S196). In this case, the radio resource allocation is changed from the dynamic radio resource allocation to the partial radio resource allocation, and the scheduling method is also changed from the centralized scheduling to the distributed scheduling.

After the scheduling method is changed to the distributed scheduling, the base station 100 performs the processes from the radio channel quality measurement and report sequence 2 (S60) to the transmission/reception of the data (S68).

In this case, just like the first embodiment, it is assumed that radio communication is frequently performed between the relay station 300 and the terminal 500 if the used radio resource amount for the communication between the relay station 300 and the terminal 500 is greater than the threshold. In this case, the base station 100 changes the operation mode to the distributed scheduling and partial radio resource allocation, then the radio resource is sufficiently allocated to the radio resource region between the relay station 300 and the terminal 500, and radio resources can be used effectively.

Fourth Embodiment

The fourth embodiment will now be described. In the fourth embodiment, the relay method of the relay station 300 is changed from the AF relay (and centralized scheduling and partial radio resource allocation) to the DF relay (and distributed scheduling and dynamic radio resource allocation) (or vice versa). According to the fourth embodiment, the relay method of the relay station 300 is changed as the radio resource allocation method and the scheduling method change.

Figure 23:
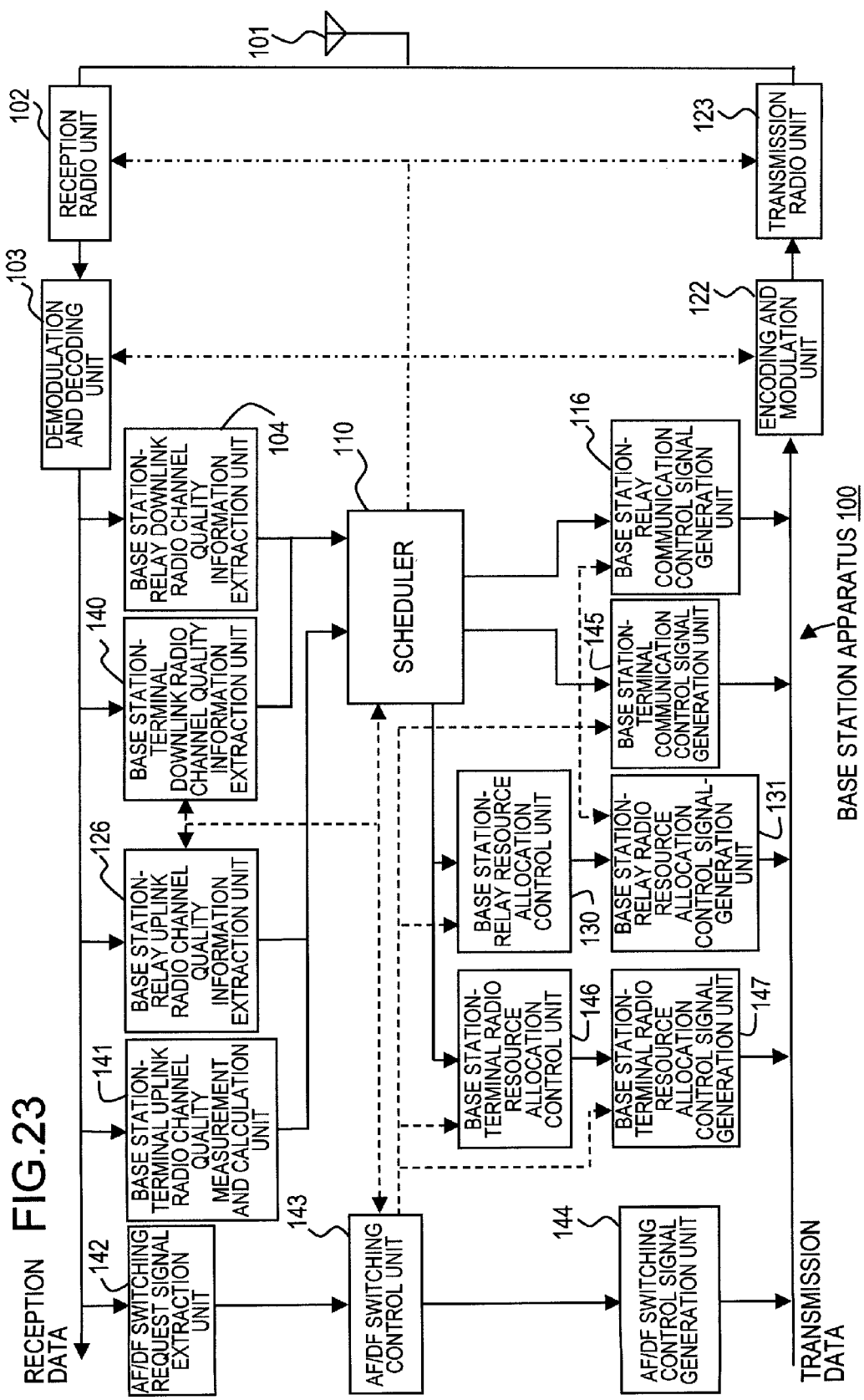
FIG. 23 illustrates a construction example of a base station apparatus.

FIG. 23 illustrates a construction example of a base station 100 according to the fourth embodiment. The base station 100 further has a base station-terminal downlink radio channel quality information extraction unit (hereafter "base station-terminal downlink quality extraction unit") 140, a base station-terminal uplink radio channel quality measurement and calculation unit (hereafter "base station-terminal uplink quality calculation unit") 141, an AD/DF switching request signal extraction unit (hereafter "switching request signal extraction unit") 142, an AF/DF switching control unit (hereafter "switching control unit") 143, an AF/DF switching control signal generation unit (hereafter "switching control signal generation unit") 144, a base station-terminal communication control signal generation unit 145, a base station-terminal radio resource allocation control unit (hereafter "base station-terminal allocation control unit") 146, and a base station-terminal radio resource allocation control signal generation unit (hereafter "base station-terminal allocation control signal generation unit") 147.

The base station-terminal downlink quality extraction unit 140 extracts radio channel quality information in the downlink direction between the base station 100 and the terminal 500 via the relay station 300 (hereafter "base station-terminal downlink quality information"). The base station-terminal downlink quality extraction unit 140 outputs the base station-terminal downlink quality information to the scheduler 110.

The base station-terminal uplink quality calculation unit 141 extracts an uplink pilot signal transmitted from the terminal 500 via the relay station 300, and measures and calculates radio communication cannel quality between the base station 100 and the terminal 500 via the relay station 300 based on the pilot signal. The base station-terminal uplink quality calculation unit 141 outputs the calculated radio communication channel quality information (hereafter "base station-terminal uplink quality information") to the scheduler 110.

The switching request signal extraction unit 142 extracts a switching request signal transmitted from the relay station 300, and outputs this signal to the switching control unit 143.

The switching control unit 143 changes the relay method of the relay station 300 from the DF method to the AF method (or vice versa) according to the switching request signal. As the DF method is changed to the AF method (or vice versa), the switching control unit 143 changes the distributed scheduling and partial radio resource allocation to the centralized scheduling and dynamic radio resource allocation (or vice versa). The switching control unit 143 changes the operation mode at the change timing, just like the first embodiment.

The switching control signal generation unit 144 generates a switching control signal, including an operation mode change notice, based on an instruction from the switching control unit 143, and outputs this signal to the encoding and modulation unit 122.

The base station-terminal communication control signal generation unit 145 operates when the relay method is the AF method, and generates a control signal on scheduling used when the base station 100 and the terminal 500 perform radio communication via the relay station 300 based on the scheduling information which is output by the scheduler 110. The base station-terminal communication control signal generation unit 145 outputs this control signal (hereafter "base station-terminal communication control signal") to the encoding and modulation unit 122.

The base station-terminal allocation control unit 146 operates when the AF method is used, and allocates radio resource to be used when the base station 100 and the terminal 500 perform radio communication via the relay station 300, based on an instruction by the scheduler 110.

Based on the information on the radio resource which is output from the base station-terminal allocation control unit 146, the base station-terminal allocation control signal generation unit 147 outputs an allocation control signal on the radio resource (hereafter "base station-terminal allocation control signal") to the encoding and modulation unit 122.

Figure 24:
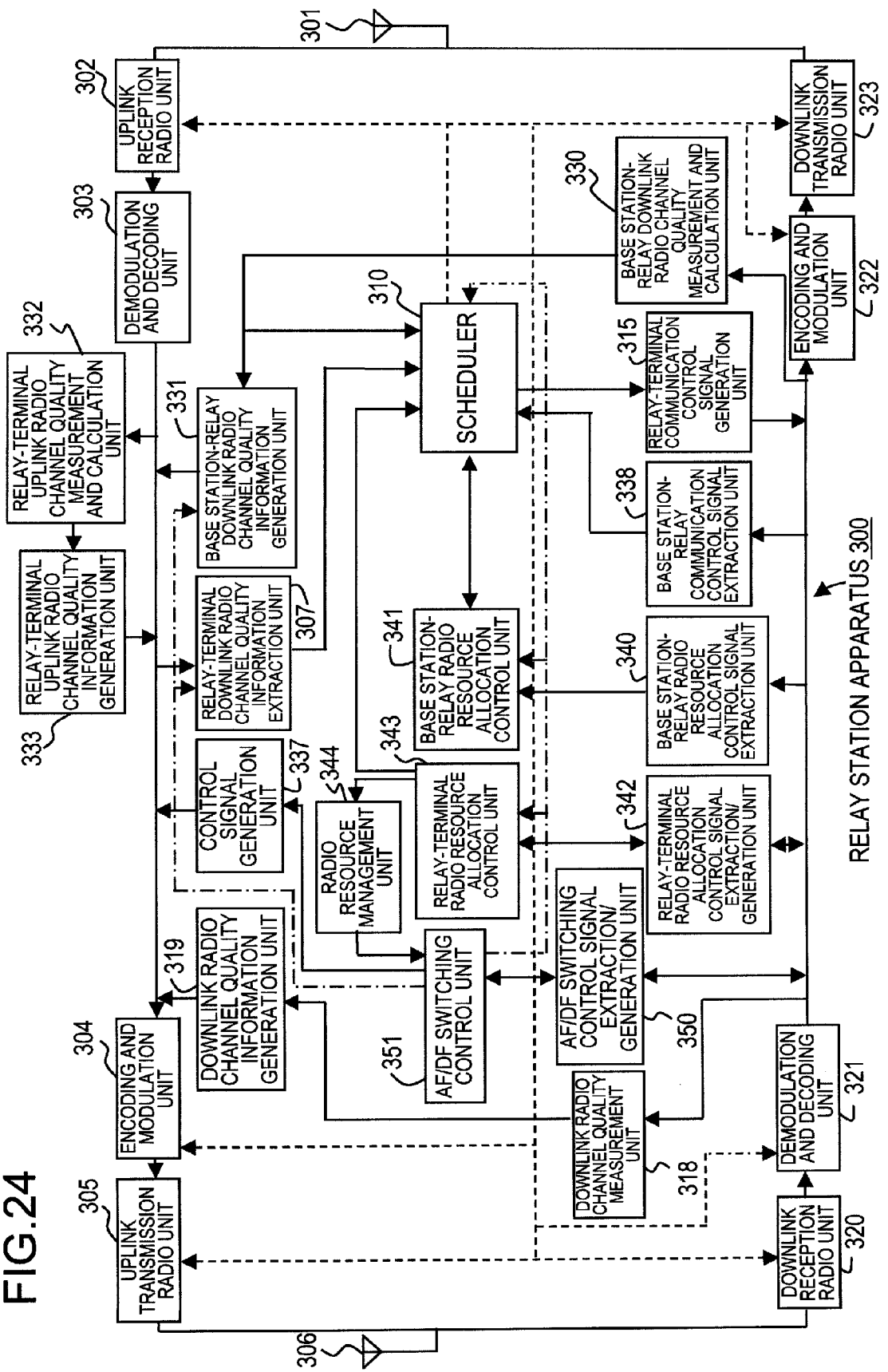
FIG. 24 illustrates a construction example of a relay station apparatus.

FIG. 24 illustrates a construction example of the relay station 300 according to the fourth embodiment. The relay station 300 further has: an AF/DF switching control signal extraction/generation unit (hereafter "switching control signal extraction/generation unit") 350, and an AF/DF switching control unit (hereafter "switching control unit") 351.

The switching control signal extraction/generation unit 350 extracts a switching control signal transmitted from the base station 100, and outputs this signal to the switching control unit 351. The switching control signal extraction/generation unit 350 also generates a switching control signal based on an instruction from the switching control unit 351, and transmits this signal to the terminal 500.

The switching control unit 351 controls the ON/OFF of the power of the encoding and modulation unit 304 based on the switching control signal from the switching control signal extraction/generation unit 350. For example, if switching to the AF method is instructed, the switching control unit 351 turns the power of each component (e.g. 302) in the relay station 300 OFF except for the uplink transmission and reception radio unit 305, the downlink transmission radio unit 323 and the antennas 301 and 306. If switching to the DF method is instructed, the switching control unit 351 turns the power of each component (e.g. 302), which is in power OFF state, ON.

A construction example of the terminal 500 is illustrated in FIG. 5.

Figure 25:
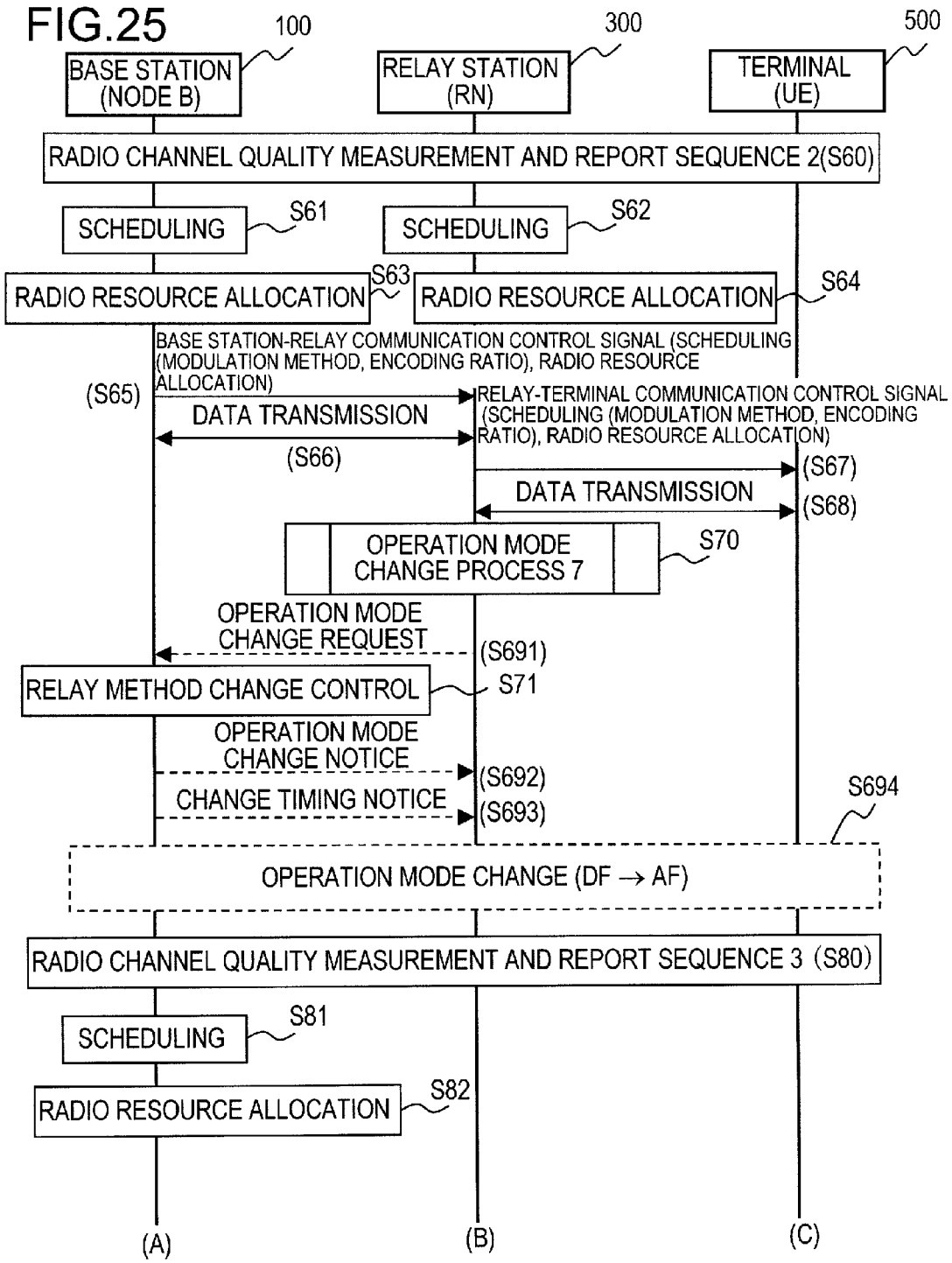
FIG. 25 is a sequence diagram illustrating an operation example.
Figure 26:
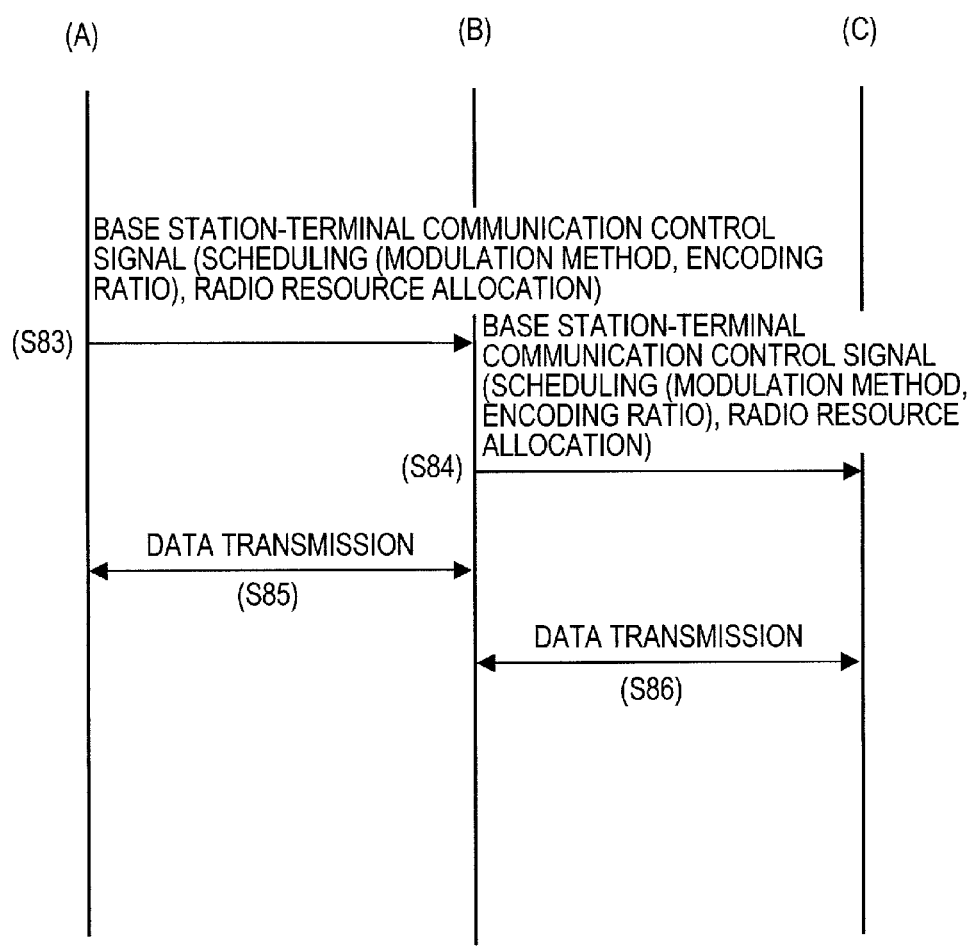
FIG. 26 is a sequence diagram illustrating an operation example.

An operation example will now be described. FIG. 25 and FIG. 26 are sequence diagrams illustrating the operation example. In the example illustrated in FIG. 25 and FIG. 26, the DF method, distributed scheduling and partial radio resource allocation are changed to the AF method, centralized scheduling and dynamic radio resource allocation. As FIG. 25 illustrates, the processes in S60 to S68 are performed in the fourth embodiment, just like the third embodiment.

Then the relay station 300 performs an operation mode change process 7 (S70). The operation mode change process 7 is the same as the operation mode change process 5 (e.g. FIG. 21) of the third embodiment. If the unused radio resource amount Rnotused is greater than the threshold Rth1 (YES in S193), the base station 100 determines that the radio communication is not frequently performed between the relay station 300 and the terminal 500, and changes the operation mode (S194, S691 to S694). In this case, the operation mode is changed from the DF method, distributed scheduling and partial radio resource allocation to the AF method, centralized scheduling and dynamic radio resource allocation. After the change, the relay station 300 operates based on the AF method, therefore the uplink transmission radio unit 305 and downlink transmission radio unit 323 which amplify data, the antennas 301 and 306, the switching control signal extraction/generation unit 350, and the switching control unit 351 operate since power is ON, but other components do not operate.

Then the base station 100, the relay station 300 and the terminal 500 perform radio channel quality measurement and a report sequence 3 (S80). FIG. 27 illustrates a sequence example of the radio channel quality measurement and the report sequence 3.

The base station 100 transmits a downlink pilot signal to the relay station 300 (S801). For example, the base station-terminal communication control signal generation unit 145 generates the downlink pilot signal, and transmits this signal.

Then the relay station 300 relays the downlink pilot signal to the terminal 500 (S802). For example, the relay station 300 operates based on the AF method, so the downlink transmission radio unit 323 amplifies the downlink pilot signal, and transmits this signal.

Then the terminal 500 measures and calculates downlink radio channel quality between the base station 100 and the terminal 500 via the relay station 300 based on the downlink pilot signal (S803), and reports this quality to the relay station 300 (S804). For example, the radio channel quality measurement unit 507 measures and calculates the radio channel quality, and the radio channel quality information generation unit 508 generates radio channel quality information (hereafter "base station-terminal downlink quality information"), and transmits this information.

Then the relay station 300 relays the base station-terminal downlink quality information (S805). For example, the uplink transmission radio unit 305 amplifies the base station-terminal downlink quality information, and transmits this information. And for example, the base station-terminal downlink quality extraction unit 140 of the base station 100 extracts the base station-terminal downlink quality information.

Then the terminal 500 transmits an uplink pilot signal to the relay station 300 (S806).

Then the relay station 300 relays the uplink pilot signal to the base station 100 (S807). For example, the uplink transmission radio unit 305 amplifies and transmits the pilot signal.

Then the base station 100 measures and calculates base station-terminal uplink quality based on the uplink pilot signal (S808). For example, the base station-terminal uplink quality calculation unit 141 measures and calculates the base station-terminal uplink quality.

Then the base station 100 performs scheduling for each terminal 500 connected via the relay station 300 based on each radio channel quality information (S81). For example, the scheduler 110 performs scheduling. In this case, centralized scheduling is performed.

Then the base station 100 allocates radio resources to each terminal 500 (S82). For example, the base station-terminal allocation control unit 146 performs allocation.

Then the base station 100 generates a base station-terminal communication control signal and a base station-terminal allocation control signal according to the scheduling (S81) and the radio resource allocation (S82), and transmits these signals to the relay station 300 (S83).

Then the relay station 300 relays the base station-terminal communication control signal and the base station-terminal allocation control signal to the terminal 500 (S84). For example, the downlink transmission radio unit 323 amplifies and transmits these control signals.

Then the base station 100 and the terminal 500 transmit and receive data via the relay station 300 (S85, S86). For example, the downlink transmission radio unit 323 and the uplink transmission radio unit 305 amplify and transmit the data.

Thus in the case of the fourth embodiment, the relay method is changed from the DF method to the AF method if the unused radio resource amount for the communication between the relay station 300 and the terminal 500 is greater than the threshold (S694). Along with this change, the scheduling method is changed from the distributed scheduling to the centralized scheduling, and furthermore, a partial radio resource allocation is changed to the dynamic radio resource allocation. Therefore in the case of the fourth embodiment as well, the radio resources can be used effectively, just like the first embodiment.

FIG. 28 is a sequence diagram illustrating an example of changing the operation mode from the AF method, centralized scheduling and dynamic radio resource allocation to the DF method, distributed scheduling and partial radio resource allocation.

The base station 100 performs process in S80 to S86.

Then the base station 100 performs an operation mode change process 8 (S90). For the operation mode change process 8, a process similar to the operation mode change process 2 of the first embodiment (e.g. FIG. 9) is performed. The base station 100, however, transmits an operation mode change notice to indicate the change from the AF method, centralized scheduling and dynamic radio resource allocation to the DF method, distributed scheduling and partial radio resource allocation (S196). The base station 100 and the relay station 300 change the operation mode from the AF method, centralized scheduling and dynamic radio resource allocation to the DF method, distributed scheduling and partial radio resource allocation (S901). For example, in the relay station 300, the power of the other components, such as the uplink reception radio unit 302, other than the uplink transmission radio unit 305, are turned ON and operate. In the base station 100, the power of the base station-terminal allocation control unit 146 is turned OFF, and the power of the base station-relay allocation control unit 130 is turned ON and operates, because of the control by the switching control unit 143. In the DF method, error correction for relay data is performed by the encoding and modulation units 304 and 322, for example.

In this case, the base station 100 changes from the AF method to the DF method if the used radio resource amount for the communication between the relay station 300 and the terminal 500 is greater than the threshold. Since the radio resource allocation method is changed from the dynamic radio resource allocation to the partial radio resource allocation, the radio resource is sufficiently allotted to the radio resource region between the relay station 300 and the terminal 500, and radio resources can be used effectively.

Other Embodiments

In the fourth embodiment, the base station 100 and the relay station 300 switch the relay method at the change timing. Generally a delay is generated during process and control more in the DF method than in the AF method, since such a process as encoding is required. Hence the base station 100 may calculate the change timing considering the delay generated in encoding process. For example, the switching control unit 351 adds the process delay to the calculated change timing, and notifies the result to the relay station 300 as the change timing. The base station 100 and the relay station 300 are switched from the DF method to the AF method at the change timing considering the delay process.

The present radio communication system 10 also has a transmission delay, because the relay station 300 is used. For example, the base station 100 may notify the relay station 300 of the timing, which is delayed for the amount of this transmission delay, as a change timing. This example can be carried out in the above mentioned first to fourth embodiments.

EXPLANATION OF REFERENCE NUMERALS 10 radio communication system
100 base station apparatus (base station)
104 base station-relay downlink radio channel quality information extraction unit (base station-relay downlink quality extraction unit)

105 relay-terminal downlink radio channel quality information extraction unit (relay-terminal downlink quality extraction unit)
106 base station-relay uplink radio channel quality measurement and calculation unit (base station-relay uplink quality calculation unit)
107 relay-terminal uplink radio channel quality information extraction unit (relay-terminal uplink quality extraction unit)
110 scheduler
111 dynamic radio resource allocation control unit (dynamic allocation control unit)
112 dynamic radio resource allocation control signal generation unit (dynamic allocation control signal generation unit)
113 partial radio resource allocation control unit (partial allocation control unit)
114 partial radio resource allocation control signal generation unit (partial allocation control signal generation unit)
115 base station-relay communication control signal generation unit
116 relay-terminal communication control signal generation unit
120 radio resource allocation control method switching control unit (switching control unit)
121 radio resource allocation control method switching control signal generation unit (switching control signal generation unit)
125 relay-terminal radio channel quality information extraction unit (relay-terminal quality extraction unit)
126 scheduling method change request signal extraction unit (change request signal extraction unit)
127 centralized/distributed switching control unit (switching control unit)
128 centralized/distributed switching control signal generation unit (switching control signal generation unit)
130 base station-relay radio resource allocation control unit (base station-relay allocation control unit)
131 base station-relay radio resource allocation control signal generation unit (base station-relay allocation control signal generation unit)
132 relay-terminal radio resource allocation control unit (relay-terminal allocation control unit)
133 relay-terminal radio resource allocation control signal generation unit (relay-terminal allocation control signal generation unit)
140 base station-terminal downlink radio channel quality information extraction unit (base station-terminal downlink quality extraction unit)
141 base station-terminal uplink radio channel quality measurement and calculation unit (base station-terminal uplink quality calculation unit)
142 AF/DF switching request signal extraction unit (switching request signal extraction unit)
143 AF/DF switching control unit (switching control unit)
144 AF/DF switching control signal generation unit (switching control signal generation unit)
145 base station-terminal communication control signal generation unit
146 base station-terminal radio resource allocation control unit (base station-terminal allocation control unit)
147 base station-terminal radio resource allocation control signal generation unit (base station-terminal allocation control signal generation unit)
300 relay station apparatus (relay station)
307 relay-terminal downlink radio channel quality information extraction unit (relay-terminal downlink quality extraction unit)
308 uplink radio channel quality measurement and calculation unit (uplink quality calculation unit)
309 uplink radio channel quality information generation unit (uplink quality information generation unit)
310 scheduler
311 dynamic radio resource allocation control signal extraction unit (dynamic allocation control signal extraction unit)
312 dynamic radio resource allocation control unit (dynamic allocation control unit)
313 partial radio resource allocation control signal extraction unit (partial allocation control signal extraction unit)
314 partial radio resource allocation control unit (partial allocation control unit)
315 relay-terminal communication control signal generation unit
316 switching control signal extraction unit
317 communication control signal extraction unit
330 base station-relay downlink radio channel quality measurement and calculation unit (base station-relay downlink quality calculation unit)
331 base station-relay downlink radio channel quality information generation unit (base station-relay downlink quality information generation unit)
332 relay-terminal uplink radio channel quality measurement and calculation unit (relay-terminal uplink quality calculation unit)
333 relay-terminal uplink radio channel quality information generation unit (relay-terminal uplink quality information generation unit)
335 centralized/distributed switching control unit (switching control unit)
336 centralized/distributed switching control signal extraction/generation unit (switching control signal extraction/generation unit)
337 control signal generation unit
338 base station-relay communication control signal extraction unit (base station-relay communication control signal extraction unit)
340 base station-relay radio resource allocation control signal extraction unit (base station-relay allocation control signal extraction unit)
341 base station-relay radio resource allocation control unit (base station-relay allocation control unit)
342 relay-terminal radio resource allocation control signal extraction/generation unit (relay-terminal allocation control signal extraction/generation unit)
343 relay-terminal radio resource allocation control unit (relay-terminal allocation control unit)
344 radio resource management unit
350 AF/DF switching control signal extraction/generation unit (switching control signal extraction/generation unit)
351 AF/DF switching control unit (switching control unit)
500 terminal apparatus (terminal)
504 communication control signal extraction unit
505 radio resource allocation control signal extraction unit (allocation control signal extraction unit)
506 control signal transmission timing information extraction unit
507 radio channel quality measurement unit
508 radio channel quality information generation unit
510 communication control unit

The invention claimed is:
1. A radio communication system comprising:
a base station apparatus;

a terminal apparatus; and
a relay station apparatus,
the base station apparatus and the terminal apparatus performing radio communication via the relay station apparatus,
the base station including:
a change unit which changes at least any of a radio resource allocation method for the relay station apparatus and the terminal apparatus, the radio resource allocation method and a scheduling method, or the radio resource allocation method, the scheduling method and a relay method in the relay station apparatus; and
a transmission unit which transmits a change notice for notifying the relay station apparatus of the change by the change unit, and
the relay station apparatus including:
a reception unit which receives the change notice, and the base station apparatus, the relay station apparatus, wherein
the terminal apparatus perform radio communication using at least the radio resources allocating or allocated by the radio resource allocation method after the change, and wherein
the radio resource allocation method is either a first allocation method in which a first radio resource used for radio communication between the base station apparatus and the relay station apparatus and a second radio resource used for radio communication between the relay station apparatus and the terminal apparatus are allocated, respectively in a region where a radio frame having a time domain and a frequency domain is divided, or a second allocation method in which the first and second radio resources are allocated at random in the radio frame.

2. The radio communication system according to claim 1, wherein the change unit performs the change based on a radio resource amount of the terminal apparatus or a number of the terminal apparatuses.

3. The radio communication system according to claim 1, wherein
the change unit determines change timing of the change based on a data amount of the transmission data stored in the relay station apparatus, and
the transmission unit includes the change timing in the change notice, and transmits the change notice to the relay station apparatus.

4. The radio communication system according to claim 1, wherein the change unit changes the allocation method to the first allocation method when the radio resource amount of the terminal apparatus or the number of the terminal apparatuses is a threshold or more, and to the second allocation method when the radio resource amount or the number of the terminal apparatuses is less than the threshold.

5. The radio communication system according to claim 1, wherein the scheduling method is either a first scheduling method for performing scheduling in the base station apparatus, or a second scheduling method for performing scheduling in the base station apparatus and the relay station apparatus, and
the change unit changes the scheduling method to the first or second scheduling method.

6. The radio communication system according to claim 5, wherein
the change unit changes the scheduling method to the second scheduling method when the radio resource amount of the terminal apparatus or the number of the terminal apparatuses is a threshold or more, and to the first scheduling method when the radio resource amount or the number of the terminal apparatuses is less than the threshold.

7. The radio communication system according to claim 1, wherein the relay method is either a first relay method for performing an error correction and amplification on relay data relayed by radio communication, or a second relay method for amplifying the relay data.

8. The radio communication system according to claim 7, wherein the change unit changes the relay method to the first relay method when the radio resource amount of the terminal apparatus or the number of the terminal apparatuses is a threshold or more, and to the second relay method when the radio resource amount or the number of terminal apparatuses is less than the threshold.

9. A base station apparatus for performing radio communication with a terminal apparatus via a relay station apparatus, the apparatus comprising:
a change unit which changes at least any of a radio resource allocation method for the relay station apparatus and the terminal apparatus, the radio resource allocation method and a scheduling method, or the radio resource allocation method, the scheduling method and a relay method in the relay station apparatus; and
a transmission unit which transmits a change notice for notifying the relay station apparatus of the change by the change unit, wherein
the base station apparatus performs radio communication with the relay station apparatus and the terminal apparatus using at least the radio resources allocating by the radio resource allocation method after the change, and wherein
the radio resource allocation method is either a first allocation method in which a first radio resource used for radio communication between the base station apparatus and the relay station apparatus and a second radio resource used for radio communication between the relay station apparatus and the terminal apparatus are allocated, respectively in a region where a radio frame having a time domain and a frequency domain is divided, or a second allocation method in which the first and second radio resources are allocated at random in the radio frame.

10. A relay station apparatus for performing radio communication with a base station apparatus and a terminal apparatus, the apparatus comprising:
a reception unit which receives a change notice for notifying a change when at least any of a radio resource allocation method for the relay station apparatus and the terminal apparatus, the radio resource allocation method and a scheduling method, or the radio resource allocation method, the scheduling method and a relay method in the relay station apparatus, is changed, wherein
the relay apparatus performs radio communication with the base station apparatus and the terminal apparatus using at least the radio resources allocating or allocated by the radio resource allocation method after the change, and wherein
the radio resource allocation method is either a first allocation method in which a first radio resource used for radio communication between the base station apparatus and the relay station apparatus and a second radio resource used for radio communication between the relay station apparatus and the terminal apparatus are allocated, respectively in a region where a radio frame having a time domain and a frequency domain is divided, or a second allocation method in which the first and second radio resources are allocated at random in the radio frame.

11. A terminal apparatus for performing radio communication with a base station apparatus via a relay station apparatus, the apparatus comprising:

a reception unit which receives from the relay station apparatus information on the radio resource for the terminal apparatus allocated by the radio resource allocation method at least after change when at least any of a radio resource allocation method for the relay station apparatus and the terminal apparatus, the radio resource allocation method and scheduling method, or the radio resource allocation method, the scheduling method and a relay method in the relay station apparatus, is changed; and a communication unit which performs radio communication with the relay station apparatus using the radio resource, wherein the radio resource allocation method is either a first allocation method in which a first radio resource used for radio communication between the base station apparatus and the relay station apparatus and a second radio resource used for radio communication between the relay station apparatus and the terminal apparatus are allocated, respectively in a region where a radio frame having a time domain and a frequency domain is divided, or a second allocation method in which the first and second radio resources are allocated at random in the radio frame.

12. A radio communication method in a radio communication system which performs radio communication between a base station apparatus and a terminal apparatus via a relay station apparatus, the method comprising:

changing at least a radio resource allocation method for the relay station apparatus and the terminal apparatus, the radio resource allocation method and a scheduling method, or the radio resource allocation method, the scheduling method and a relay method in the relay station apparatus, by the base station apparatus;

transmitting a change notice for notifying the relay station apparatus of the change by the change unit, by the base station apparatus; and receiving the change notice, by the relay station, wherein the base station apparatus, the relay station apparatus, and the terminal apparatus perform radio communication using at least the radio resources allocating or allocated by the radio resource allocation method after the change, wherein the radio resource allocation method is either a first allocation method in which a first radio resource used for radio communication between the base station apparatus and the relay station apparatus and a second radio resource used for radio communication between the relay station apparatus and the terminal apparatus are allocated, respectively in a region where a radio frame having a time domain and a frequency domain is divided, or a second allocation method in which the first and second radio resources are allocated at random in the radio frame.

* * * * *

UNITED STATES PATENT AND TRADEMARK OFFICE
CERTIFICATE OF CORRECTION

| | | |
|---|---|---|
| PATENT NO. | : 8,548,486 B2 | Page 1 of 1 |
| APPLICATION NO. | : 13/338494 | |
| DATED | : October 1, 2013 | |
| INVENTOR(S) | : Takayoshi Ode et al. | |

It is certified that error appears in the above-identified patent and that said Letters Patent is hereby corrected as shown below:

Title page, item (63) should read as follows:

-- (63)    Related U.S. Application Data

Continuation of application No. PCT/JP2009/003324, filed on Jul. 15, 2009. --

Signed and Sealed this
First Day of April, 2014

Michelle K. Lee
*Deputy Director of the United States Patent and Trademark Office*